(12) United States Patent
Bays

(10) Patent No.: US 7,773,533 B2
(45) Date of Patent: Aug. 10, 2010

(54) METHODS, APPARATUSES AND SYSTEMS FACILITATING DETERMINATION OF NETWORK PATH METRICS

(75) Inventor: Robert James Bays, San Francisco, CA (US)

(73) Assignee: Transaction Network Services, Inc., Reston, VA (US)

( * ) Notice: Subject to any disclaimer, the term of this patent is extended or adjusted under 35 U.S.C. 154(b) by 362 days.

(21) Appl. No.: 11/776,055

(22) Filed: Jul. 11, 2007

(65) Prior Publication Data

US 2009/0016335 A1 Jan. 15, 2009

Related U.S. Application Data

(62) Division of application No. 10/133,005, filed on Apr. 26, 2002, now Pat. No. 7,260,645.

(51) Int. Cl.
*H04L 12/26* (2006.01)
(52) U.S. Cl. ...................... 370/248; 370/241
(58) Field of Classification Search ............... 370/351, 370/389, 392, 411, 248, 241, 252, 400, 401, 370/395.3
See application file for complete search history.

(56) References Cited

U.S. PATENT DOCUMENTS

2002/0141378 A1* 10/2002 Bays et al. ................. 370/351

* cited by examiner

*Primary Examiner*—Brenda Pham

(57) ABSTRACT

Methods, apparatuses and systems relating to the control and application of policies for routing data over a computer network, such as the Internet. Some implementations of the invention facilitate the configuration, deployment and/or maintenance of network routing policies. Some implementations of the invention are particularly useful for controlling the routing of data among autonomous systems or organizations. Certain implementations allow for dynamic modification of routing policy based on such factors as current Internet performance, load sharing, user-defined parameters, and time of day. In one embodiment, the present invention provides methods, apparatuses and systems implementing enhanced network path testing methodologies that enhance the efficiency of processes associated with testing of a network path, while reducing the perceived intrusiveness of test packets associated with such metrics tests.

5 Claims, 20 Drawing Sheets

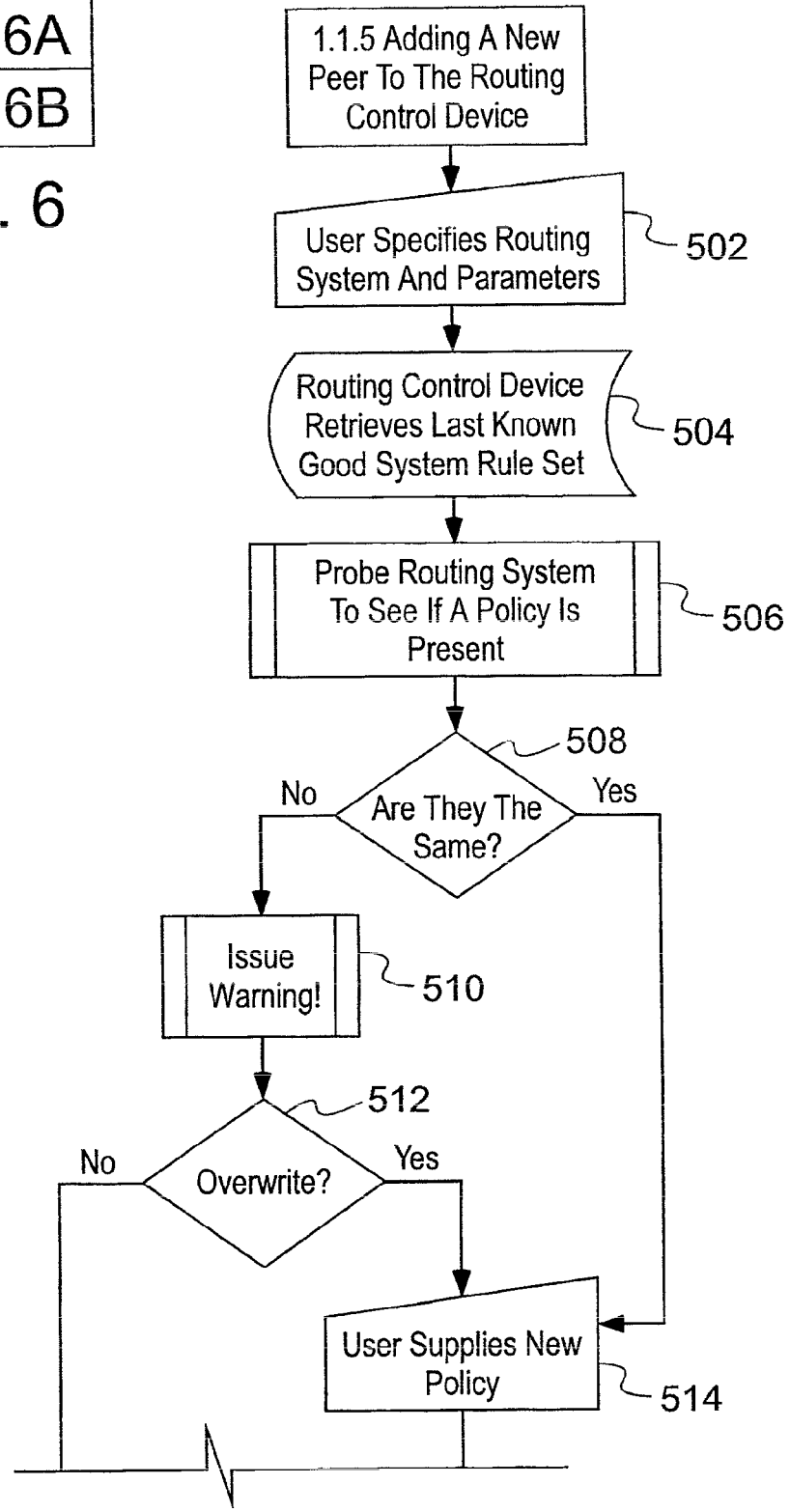

| Group | Network Prefix | Network Prefix | Network Prefix |
|---|---|---|---|
| Group 1 | 1.0.0.0/24 | 2.0.0.0/24 | 3.0.0.0/24 |
| | Path1 | Path1 | Path1 |
| | Path2 | Path2 | Path2 |
| | | | Path3 |
| Group 2 | 1.2.0.0/24 | 1.3.0.0/24 | 1.4.0.0/24 |
| | Path1 | Path1 | Path1 |
| | Path2 | Path2 | Path2 |
| | Path3 | | Path3 |
| Group 3 | 2.2.0.0/24 | 2.2.0.0/24 | 2.2.0.0/24 |
| | Path1 | Path1 | Path1 |
| | Path2 | Path2 | Path2 |
| | | Path3 | |
| ... | ... | ... | ... |

Table 12

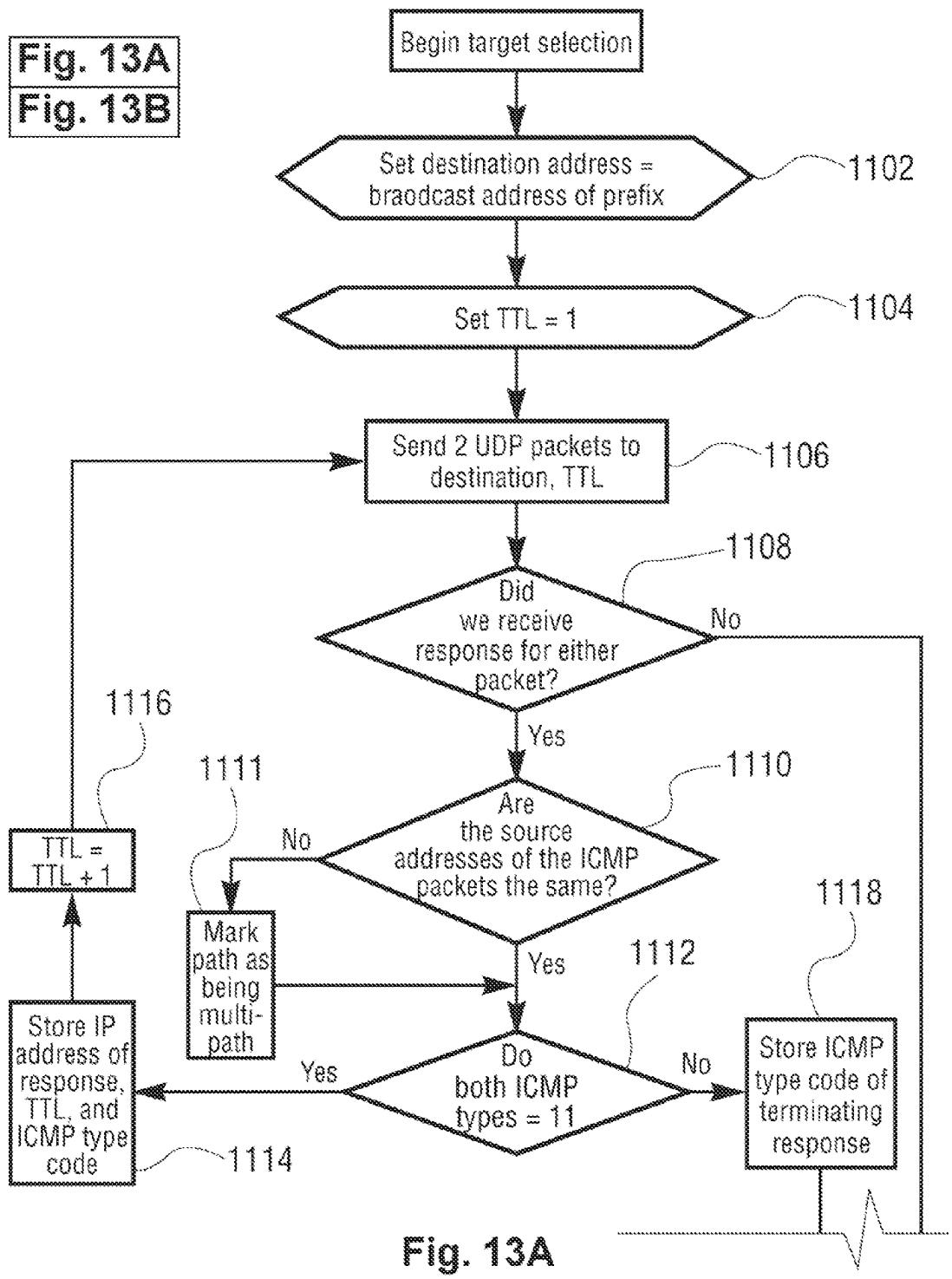

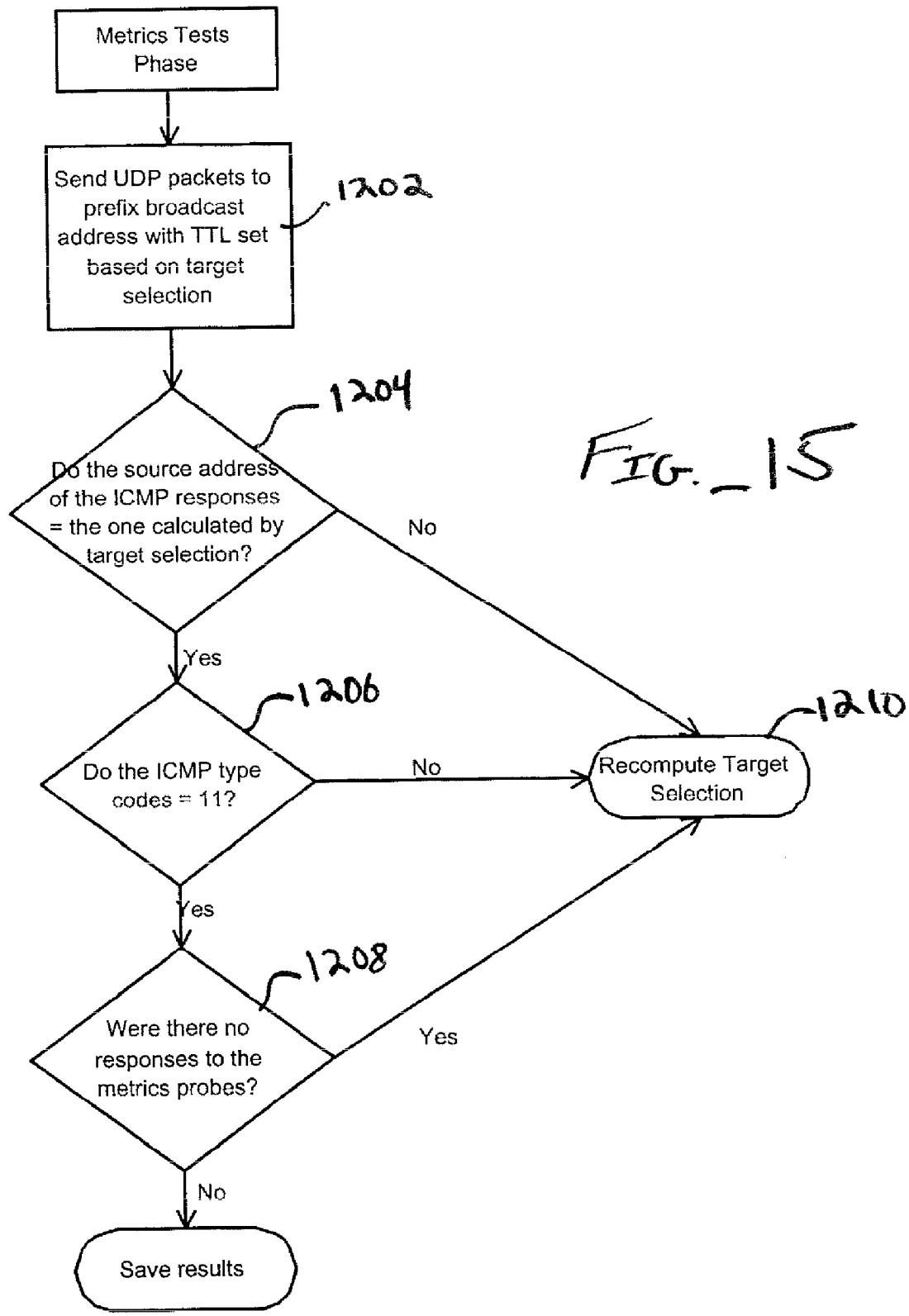

METHODS, APPARATUSES AND SYSTEMS FACILITATING DETERMINATION OF NETWORK PATH METRICS

REFERENCE TO RELATED APPLICATION

This application is a divisional application that claims the benefit of U.S. patent application Ser. No. 10/133,005 now U.S. Pat. No. 7,260,645 entitled "Methods, Apparatuses and Systems Facilitating Determination of Network Path Metrics", filed on Apr. 26, 2002, which is hereby incorporated by reference for all purposes.

FIELD OF THE INVENTION

The present invention relates to the configuration, deployment and/or maintenance of network routing policies and, more particularly, to methods, apparatuses and systems facilitating the testing of paths to destination networks.

BACKGROUND OF THE INVENTION

The Internet is expanding rapidly in terms of the number of interconnected organizations or autonomous systems and the amount of data being routed among such organizations or systems. This growth affects the performance and reliability of data transfer, among Internet Service Providers, between enterprise service providers, within enterprise networks. One of the most difficult and important aspects of modern networking is properly deploying and maintaining routing policies for the routing of data among the ever-increasing number of autonomous systems and organizations. Sub-optimal Internet connectivity can lead to a poorly or inconsistently performing web site, adversely affecting a company's brand and reputation.

Border Gateway Protocol (BGP), the standard inter-domain routing protocol, has proven to be notoriously difficult to initially configure and even more complicated to correctly support. Furthermore, the concept of Autonomous Systems (ASs), which is integral to the protocol, hides routing metrics from the end systems resulting in sub-optimal routing decisions. The AS Path metric, which is an enumeration of the set of autonomous systems that a data packet travels through, is the primary metric BGP uses to select best path. This metric assumes that the shortest AS path metric is the best route to a given destination network; however, given the ever-increasing expansion of the Internet and the wide array of devices connected thereto, the AS Path metric is often not a very good predictor of the best path to a given destination network. Indeed, the default BGP metric does not account for other factors affecting routing path performance, such as link utilization, capacity, error rate or cost, when making routing decisions. In addition, BGP, version 4 (BSP4), the current BGP version, does not allow for adjustments necessitated by the consolidation that has taken and is currently taking place within the industry that has resulted in the collapse of smaller, formerly discrete networks into expansive, single autonomous networks. Consequently, the default BGP4 configuration often leads to poor network performance and creates reliability issues for many organizations.

Testing the performance characteristics of a particular route to a destination network is generally accomplished by transmitting test packets to a node in the destination network (and/or intermediate systems along the communications path) and monitoring for responses to the test packets. From the receipt, timing and type of response, as well as the number and size of the individual test packets, various route performance and other characteristics can be computed or inferred, such as 1) response time, 2) hop count, 3) available bandwidth, 4) jitter, 5) throughput, and 6) network loss. Probing a path to a destination network host with a series of test packets, however, is often problematic because a response is not generally guaranteed in many instances. For example, a firewall residing at the network destination gateway may intercept the test packets and, rather than returning a response, merely drops the test packets. In addition, such probe or test packets, when detected and reported by a firewall, may raise the ire of a network administrator who may view the test packets as suspicious hacker activity.

In light of the foregoing, a need in the art exists for methods, apparatuses and systems that address the issues presented by configuration and deployment of inter-domain routing policies. In addition, a need further exists for methods, apparatuses and systems that allow for augmentation of current routing policy metrics with more intelligent ones, leading to better routing decisions. In light of the foregoing, a further need in the art exists for methods and systems that maximize the likelihood of receiving responses to probe packets, while minimizing the perception that such probes are malicious or otherwise intrusive, to thereby facilitate testing the performance or other characteristics of a network path. Embodiments of the present invention substantially fulfill this need.

SUMMARY OF THE INVENTION

The present invention relates to methods, apparatuses, and systems for controlling or applying policies for routing data over a computer network, such as the Internet. Some implementations of the invention facilitate the configuration, deployment and/or maintenance of network routing policies. Some implementations of the invention are particularly useful for controlling the routing of data among autonomous systems or organizations. Certain implementations allow for dynamic modification of routing policy based on such factors as current Internet performance, load sharing, user-defined parameters, and time of day.

In one embodiment, the present invention provides methods, apparatuses and systems implementing enhanced network path testing methodologies that enhance the efficiency of processes associated with testing of a network path, while reducing the perceived intrusiveness of test packets associated with such metrics tests. Embodiments of the present invention configure test packets in a manner that takes advantage of the protocols implemented by the large majority of hosts or gateways on the Internet to increase the likelihood of receiving a response. The same configuration also reduces the perceived intrusiveness of the test packets. In one embodiment, the present invention utilizes hop-limited test packets configured to expire at a previously defined target intermediate system in a communications path to a destination network. The present invention, in one embodiment, also features an interleaved route injection and testing process that enhances the efficiency of testing paths to a large number of network prefixes.

Table 12 provides, for didactic purposes, a network prefix dataset, including the paths corresponding to each network prefix, segregated into a plurality of interleave groups.

Figure 13B:
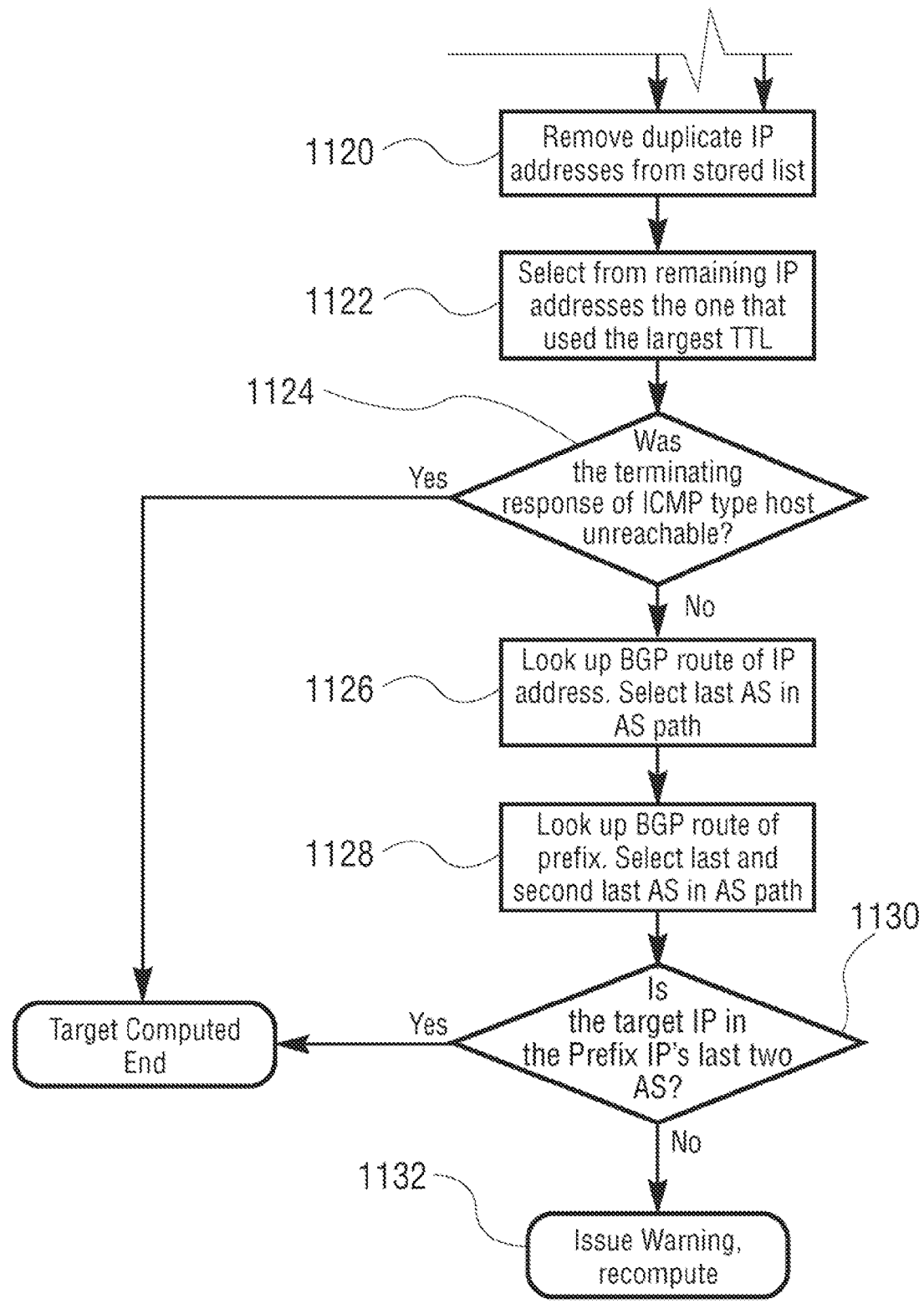

FIG. 13 is a flow chart diagram setting forth a method directed to the identification of a target intermediate system in a path to a destination network.

Figure 14:
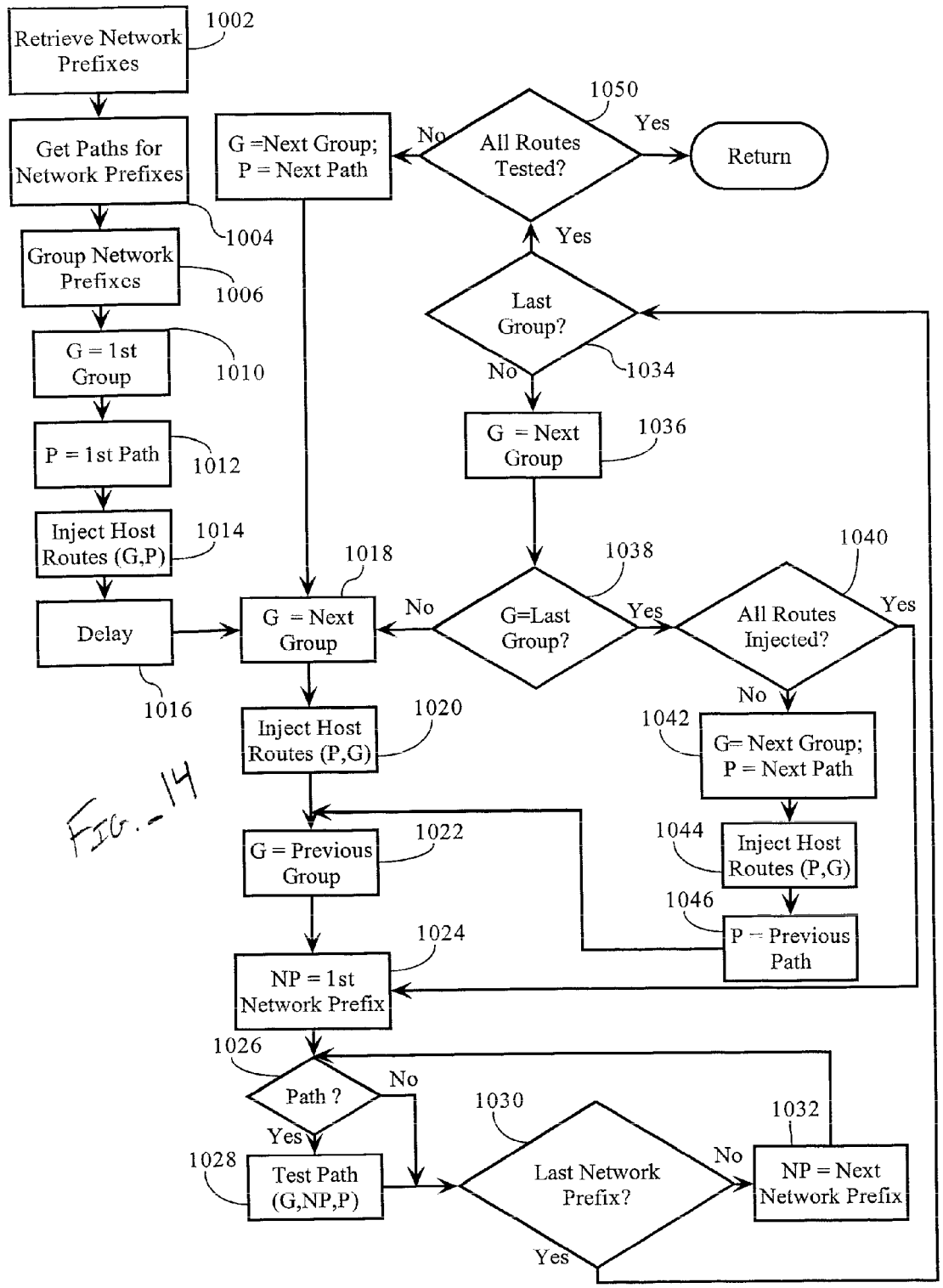

FIG. 14 is a flow chart diagram illustrating an interleaved route injection and testing method according to one embodiment of the present invention.

FIG. 15 is a flow chart diagram providing a method associated with testing a path to a destination network.

DESCRIPTION OF PREFERRED EMBODIMENT(S)

Certain embodiments of the present invention involve a routing control device 20 that can be deployed within a network environment and used to manipulate routing policy implemented by routing systems 30 (e.g., applying path preferences to routing systems). In some embodiments the routing control device 20 is an Internet appliance and, in some embodiments, routing control device 20 obtains routing path information and modifies the operation of associated routing systems 30. In some embodiments, a central server 40 in connection with a plurality of data collectors 90 obtains path information for use by one or more routing policy control devices 20 (see FIG. 2). As described below, the functionality described herein can be deployed in a variety of configurations from stand-alone Internet appliances to centrally and virtually managed services.

Figure 1:
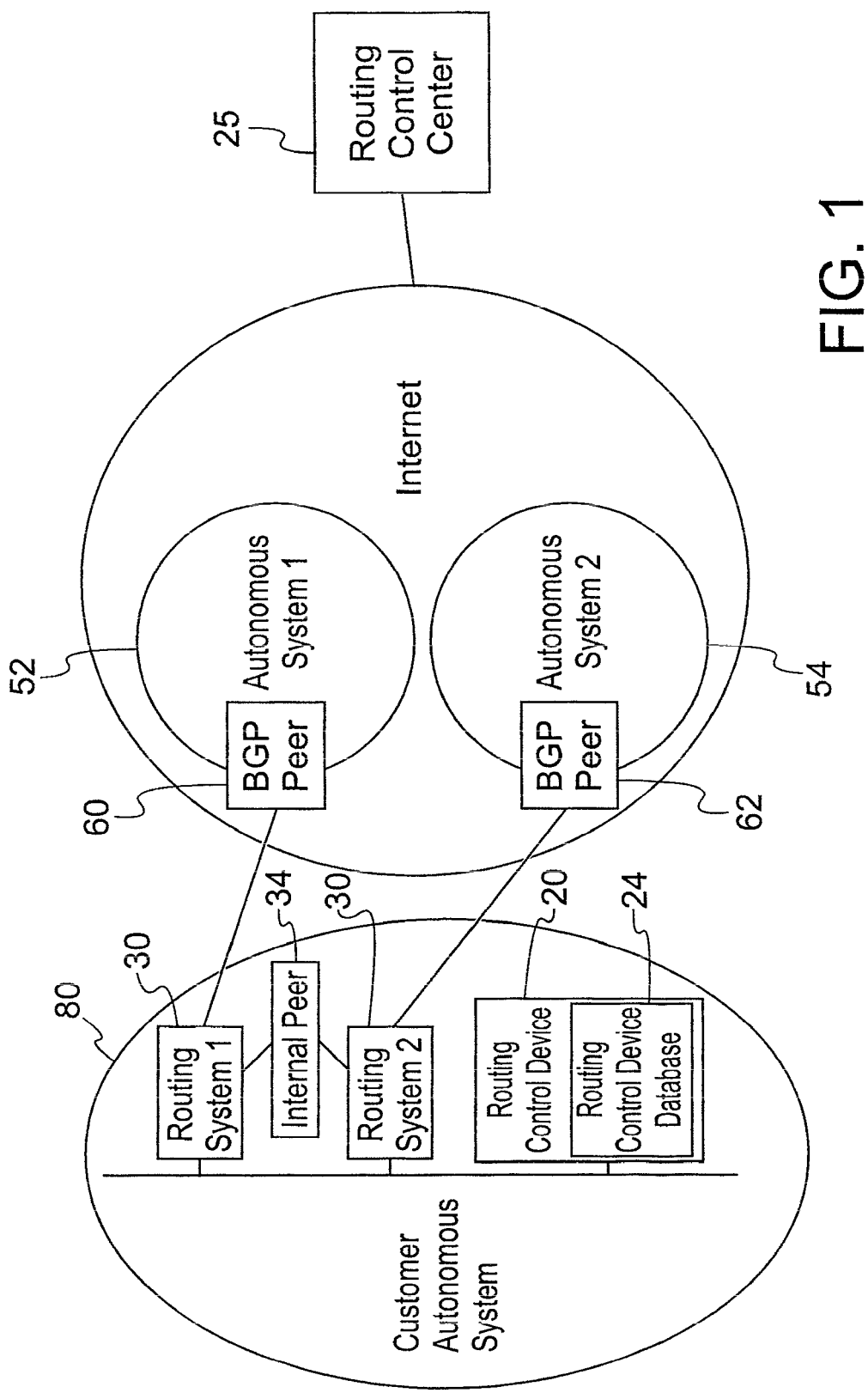
FIG. 1 is a functional block diagram illustrating a computer network environment and one embodiment of the present invention.

FIG. 1 illustrates a computer network environment including an embodiment of the present invention. As FIG. 1 illustrates, the computer network environment includes autonomous systems 52 and 54, each of which are a single network or a collection of networks under a common administrative policy and registration. In one embodiment, routing control device 20 is operably coupled to at least one routing system 30 within a customer autonomous system 80. The computer network environment, in one embodiment, also includes routing control center 25 providing a centralized point of administration and/or access to one or more routing control devices 20.

As FIG. 1 illustrates, routing control device 20 operates in connection with routing control device database 24. Routing control device database 24 may be an integral part of routing control device 20 or, in other forms, may reside in a separate database server. In one form, routing control device database 24 includes routing control device configuration data, configuration policies, routing system rule sets, and test results (e.g., routing path metrics and/or traffic data). In one form, routing control device database 24 includes routing system profiles for each routing system connected to routing control device 20.

Figure 2:
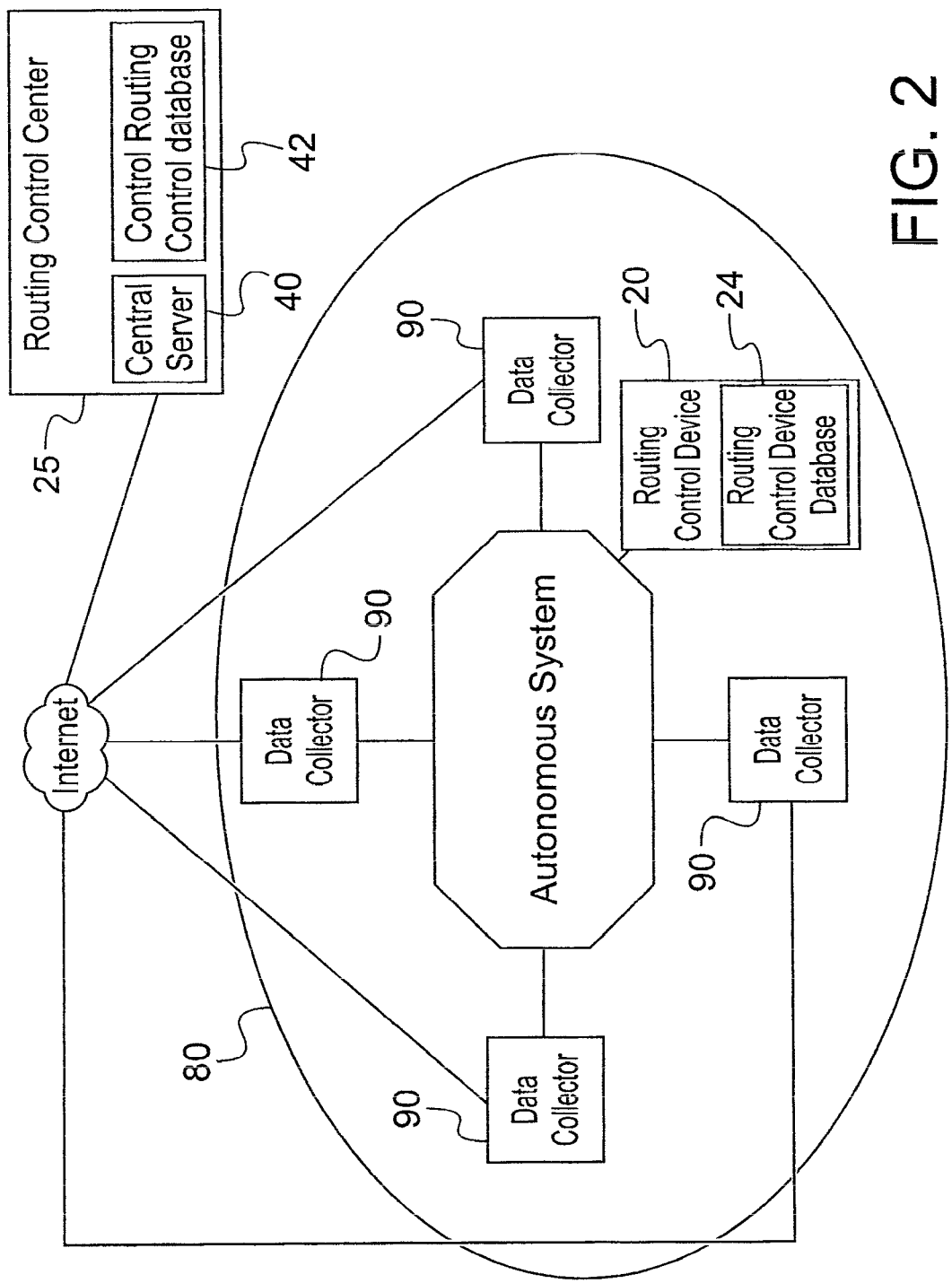
FIG. 2 is a functional block diagram illustrating a computer network environment and an embodiment of the present invention utilizing a central server and data collector system.

FIG. 2 illustrates a system providing a centralized source for Internet routing policy. The system, in one embodiment, comprises a central server 40 operably connected to a plurality of data collectors 90 within an autonomous system 80. Although only one autonomous system 80 is shown, sets of data collectors 90 may be deployed on multiple autonomous systems, respectively. Operation of the central server 40 and the data collectors 90 is described in more detail below.

1.0 Functionality

The following describes the functionality of an embodiment of the present invention.

Figure 3:
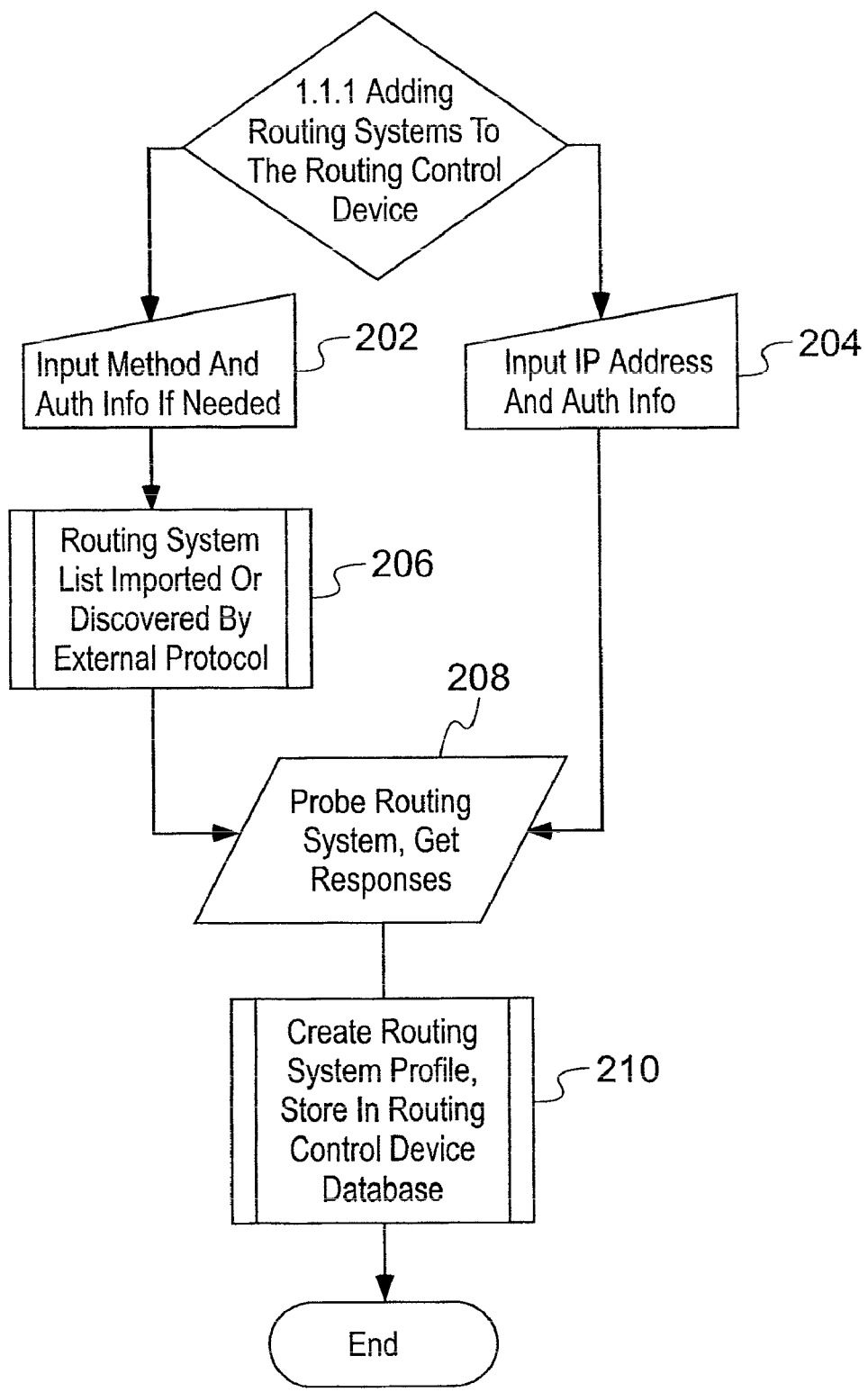
FIG. 3 is a flow chart diagram illustrating a method for adding a routing system to a routing control device according to one embodiment of the invention.

1.1 Routing Policy Configuration 1.1.1 Adding Routing Systems to the Routing Control Device A routing system 30 is any machine capable of routing data between two networks and sharing network layer reachability information between one or more routing systems. In one embodiment, routing systems 30 share network layer reachability information via BGP. The user may add routing systems 30 to routing control device 20 by supplying the IP address or fully qualified domain name of a primary interface and access authority information for the routing system (FIG. 3, step 204). Optionally, routing control device 20 may import a set of routing systems from an external source or via a system discovery protocol (FIG. 3, step 206). A primary interface is one that has a known IP address or a fully qualified domain name assigned for the duration of the life of the routing system. Access authority information usually consists of a user name, password combination but may contain other necessary information for a specific authentication protocol and should be supplied for each type of access method supported by routing control device 20 (see step 202). Access methods include Simple Network Management Protocol (SNMP) queries, interactive sessions to terminal interfaces, and other proprietary access protocols. The routing system 30 is initially probed using the supplied access method to determine system wide parameters such as make and model of the routing system (FIG. 3, step 208). The routing system 30 may be probed using multiple access methods as required to obtain the system wide parameters. After all routing system responses have been collected, a routing system profile consisting of the user supplied information combined with probe responses is stored in routing control device database 24 (FIG. 3, step 210).

1.1.2 Defining Network Routing Policy Configuration

Routing control device 20 includes a predefined or default routing policy configuration, called the default device configuration policy. In one embodiment, the default routing policy configuration is stored in routing control device database 24. This set of routing policies defines a default configuration rule set that determines how inter-domain routing should be configured based on current industry best practices. All actions routing control device 20 makes are directly or indirectly based on this default configuration rule set. The user can update the default device configuration policy periodically by querying a central server (e.g., such as a server located at routing control center 25) and downloading the latest default device configuration policy, if desired. The user can further modify the default device configuration policy to apply customized network wide configuration parameters by supplying the requested policy as a local configuration policy that is input to routing control device 20 using a graphical interface, a configuration file, or a command line interface. This local configuration policy is checked for errors based on the specifications of the default device configuration policy. The local configuration policy is then saved in routing control device database 24, over-writing any previously saved local configuration policies. Each time routing control device 20 is powered on it reads the local configuration policy from routing control device database 24 and if it exists, combines it with the default configuration policy. This combined policy becomes the primary configuration policy for routing control device 20. In one embodiment, a user may specify a local configuration policy for each routing system 30; routing control device 20 therefore generates a primary configuration policy for each routing system 30.

1.1.3 Applying Routing Policy Configurations to Routing Systems

Routing control device 20 enforces the primary configuration policy on any routing system 30 for which it is requested to control. When a routing system is added, routing control device 20 checks the routing system rule set for inconsistencies with the primary configuration policy and changes the routing system rule set to be consistent with the primary configuration policy for routing control device 20.

Figure 4:
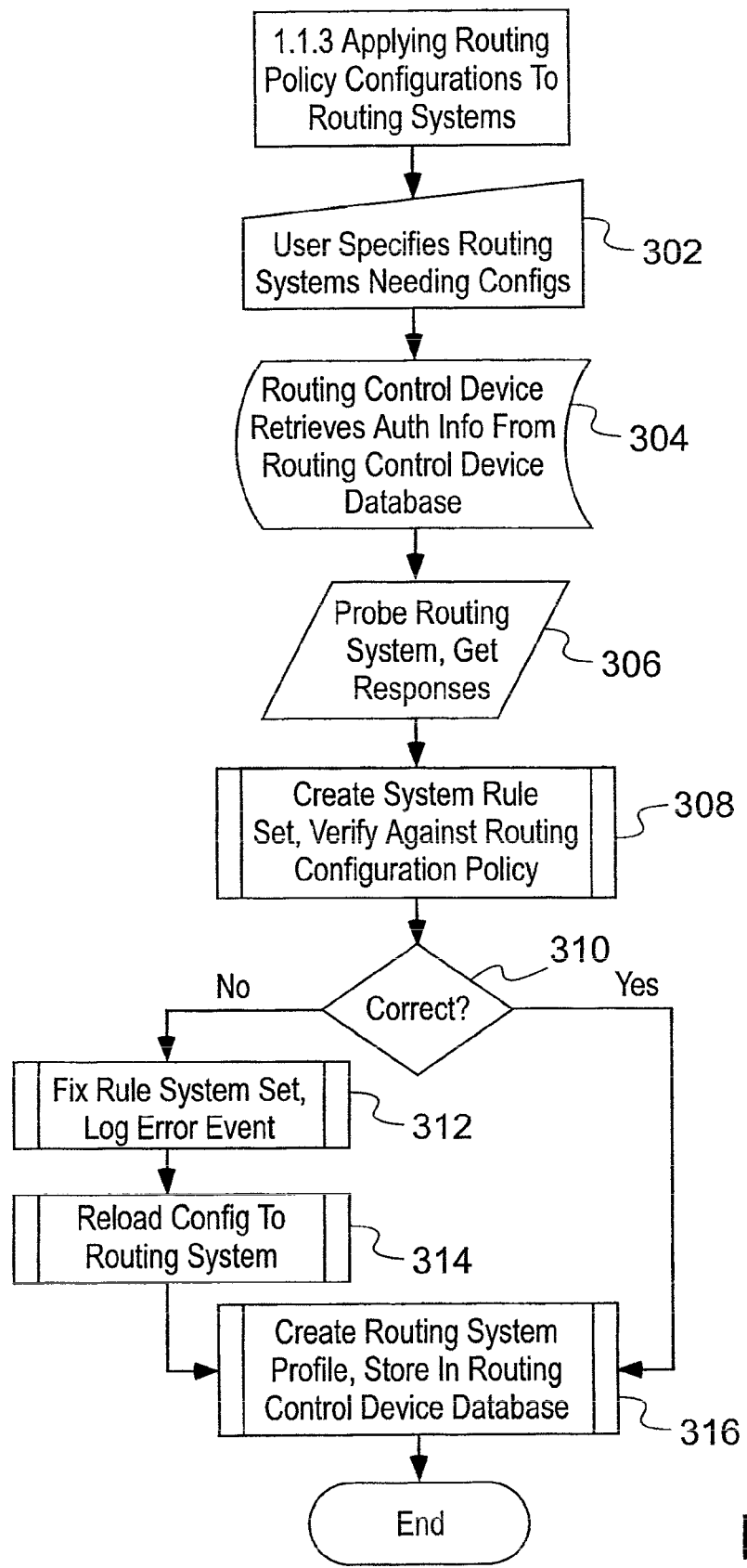
FIG. 4 is a flow chart diagram setting forth a method for applying a routing policy configuration to one or more routing systems.

In particular and in one embodiment, once a routing system has been added to routing control device 20 initially, the routing system 30 must be configured. Subsequent changes in the primary device configuration policy may also require the routing system 30 to be reconfigured. To do this, the user specifies the routing system(s) 30 to be configured (FIG. 4, step 302). Query methods and access authority information are retrieved for the corresponding IP addresses or fully qualified domain names from routing control device database 24 (step 304). Routing control device 20 then queries the routing systems 30 to assemble a current routing system configuration for each routing system 30 using the appropriate query method (step 306). The retrieved routing system configuration is interpreted to define the current BGP peering setup as a rule set per routing system called a system rule set (step 308). This system rule set includes the entire data set of configuration information for the peers such as IP addresses, autonomous systems, filters, descriptions, and peering options. If the retrieved system rule set is in conflict with the primary device configuration policy of routing control device 20, routing control device 20 logs an error, fixes the system rule set (step 312), and applies the updated system rule set to the routing system 30 (step 314). The finalized system rule set is stored in the routing control database 24 for later retrieval (step 316). Parameters in the system rule set may be translated into user-friendly names using a proprietary database of information. For example routing control device 20 may map autonomous system numbers to network names.

1.1.4 Removing a Routing System from the Routing Control Device

Figure 5:
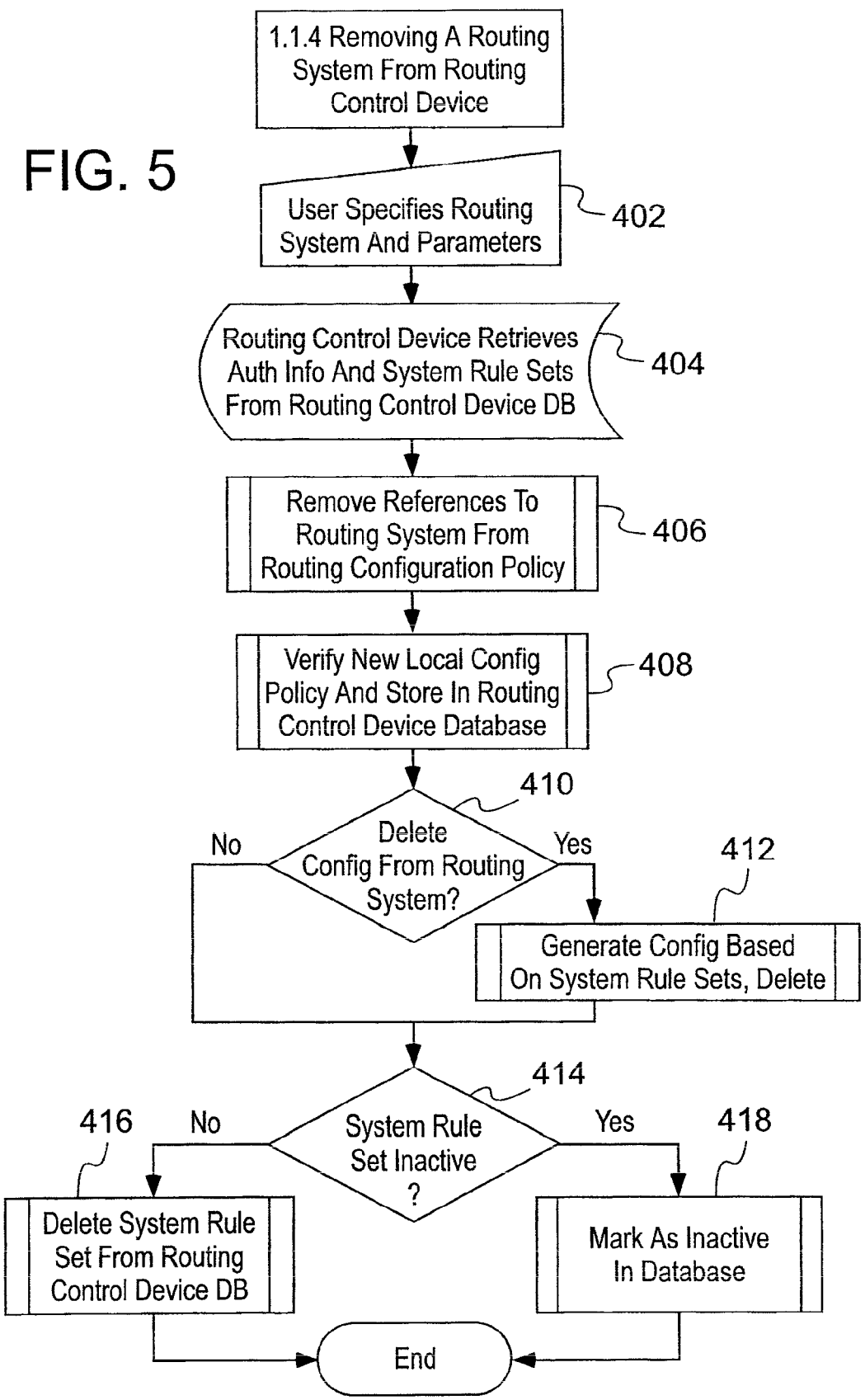
FIG. 5 is a flow chart diagram providing a method for removing a routing system.

The user identifies the routing system to be removed from routing control device 20 (FIG. 5, step 402). Routing control device 20 retrieves access authority information and system rule sets from routing control device database 24 (step 404). Routing control device 20 removes all references to the routing system from the local configuration policy (step 406), if any exist, and re-runs the verification routines on the resulting local configuration policy (step 408). If the new local configuration policy passes the verification process, any reference to peers and system parameters for the removed routing system are removed from routing control device database 24. The user may request the system rule set for the deleted routing system to continue to be stored in routing control database 24 for future use after being marked as inactive by routing control device 20 (see steps 414 and 418). If left in routing control device database 24, the system rule set will not affect any routing control device 20 decisions as long as it is marked inactive. If the system rule set is not marked inactive, routing control device 20 removes it from the routing control device database 24 (step 416). The user may request that routing control device 20 remove all corresponding configurations from the routing system (see step 410). If so, routing control device 20 will generate the necessary configurations from the existing system rule sets before they are deleted from routing control device database 24 (step 412). Routing control device 20 will then use the default access method to remove the routing configurations from the routing system before continuing.

1.1.5 Adding a New Peer to the Routing Control Device

When a routing system has been added, routing control device 20 configures the peering relationships associated with the routing system in order to apply the primary routing policy configuration.

Figure 6B:
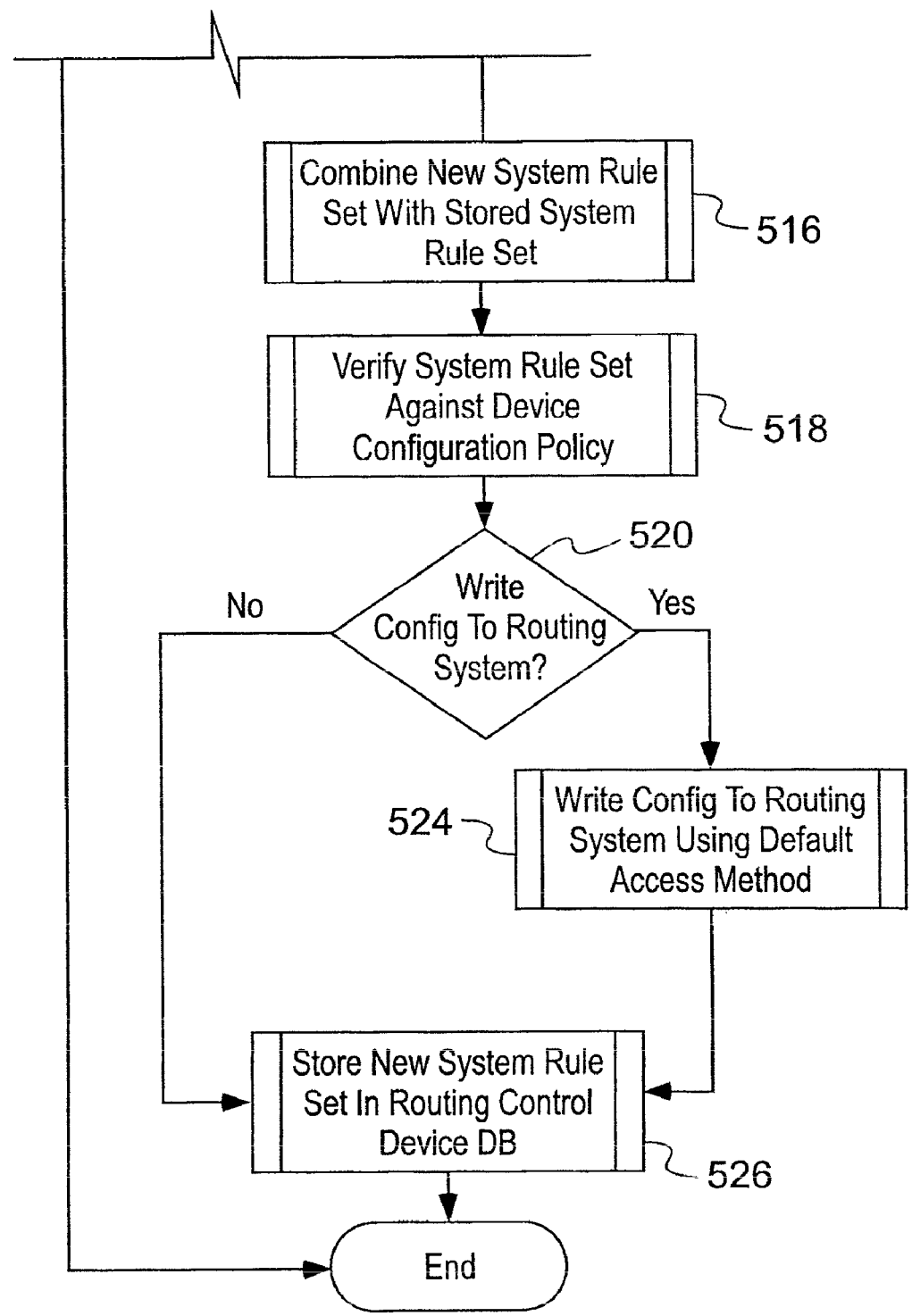
FIG. 6 is a flow chart diagram illustrating a method for adding a new peer to a routing control device.

The user must supply a nominal amount of information to have routing control device 20 configure a new peer (e.g., an inter-domain peer or internal peer) or modify an existing one. Minimally, the user provides routing control device 20 with the name of the routing system 30 being configured and the IP address of the peer (e.g., inter-domain peer 60 or 62 or internal peer 34) (FIG. 6, step 502). Optionally, the user can supply routing control device 20 with additional policy requirements for this peer such as peer-specific filtering or transit parameters. Each time a new peering configuration—that is, the portion of the system rule set specific to the peer—is generated, the peering configuration state on the routing system 30 is compared with the lost known good peering configuration saved in the routing control device database 24, if one exists, to ensure consistency and to detect any non-routing-control-device-20-introduced changes.

This is accomplished by retrieving the current peering configuration from the routing system 30 (step 506), translating it into a system rule set, and comparing it to the version stored in routing control device database 24 (see steps 504 and 508). If the system rule sets do not match (step 508), a warning is issued (step 510) and by default the action is aborted. However, the user may specify that if the retrieved system rule set does not match the stored system rule set, routing control device 20 should overwrite the existing configuration using the new stored system rule set (step 512). Once the system rule sets have been compared, the user supplies data explaining the desired policy outcome by responding to questions from a predefined template (step 514). This data is combined with the previously stored system rule set to generate an inclusive view of the desired routing policy for that peer (step 516). This inclusive system rule set is interpreted against the primary configuration policy and formatted to generate the new peer configuration. The completed rule set is verified for consistency with network wide policy and translated to the proper configuration nomenclature for the routing system (step 518). Unless otherwise instructed by the user (see step 520), routing control device 20 will use the previously stored default access method for the routing system to apply the new configuration (step 522). The user has the option, however, of overriding this step and choosing to apply the configuration generated by the routing control device 20 manually to the routing system. Finally, the old system rule set is replaced with the new one in routing control device database 24 (step 524).

1.1.6 Importing Existing Peers to the Routing Control Device

Figure 7:
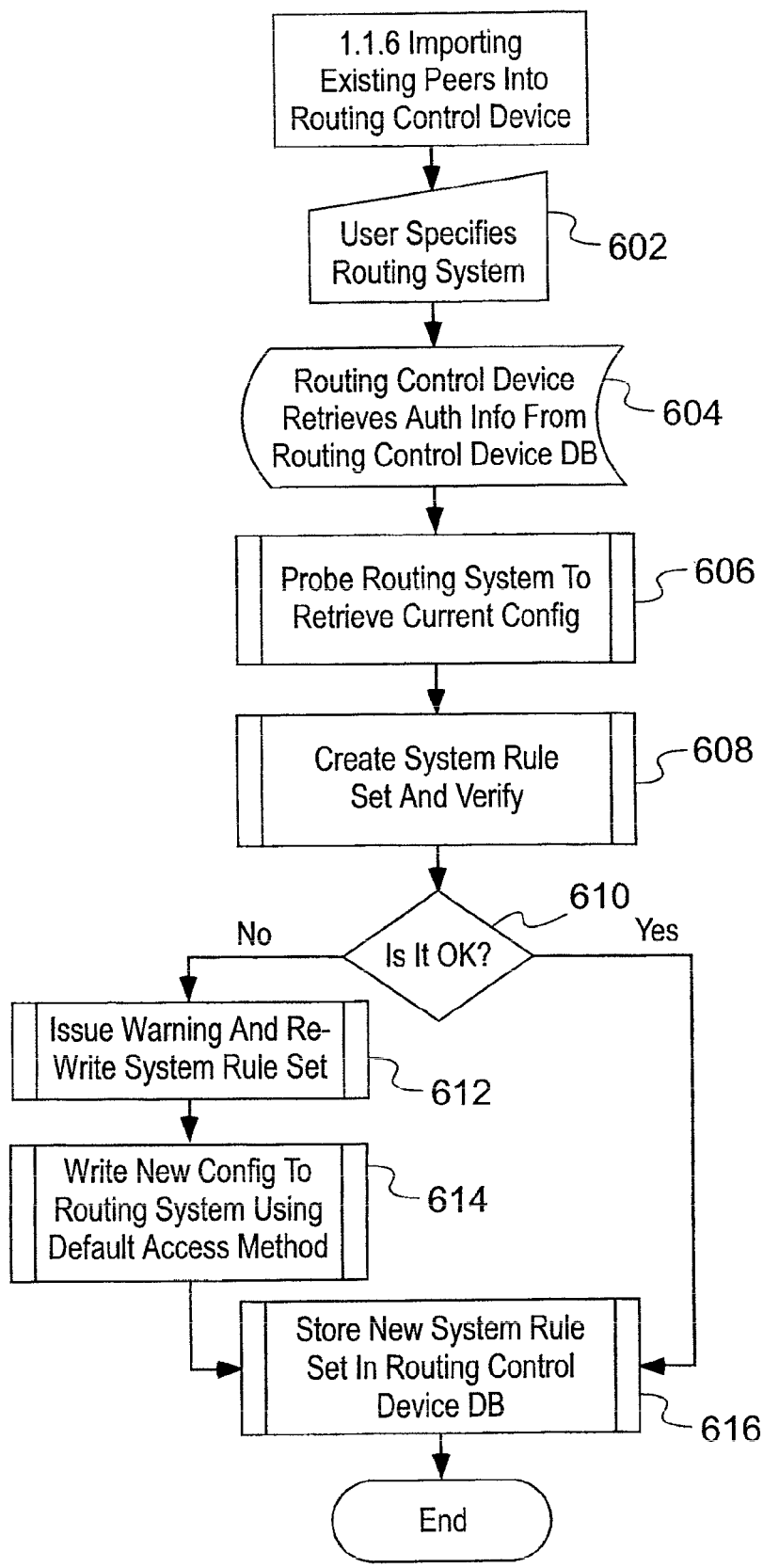
FIG. 7 is a flow chart diagram setting forth a method for importing existing peers to a routing control device.

There may be instances where a peer is manually added to a routing system. The user may add these existing peers to the routing control device by supplying the IP address or fully qualified domain name of the routing system where the peer exists (FIG. 7, step 602). Routing control device 20 retrieves access authorization information from routing control device database 24 (step 604), queries the routing system using the default access method to retrieve the current peering configuration from the routing system (step 606) and translates it into a system rule set. Next, the peer's retrieved rule set is analyzed for compliance with the primary configuration policy (steps 608 and 640). If non-complaint entries exist in the system rule set, they are re-written (if possible) so that the original intent of the desired routing policy is not lost but the resulting system rule set now complies with the primary configuration policy (steps 612). If the system rule set has been changed, the resulting configuration is written to the routing system (step 614). Finally, routing control device 20 stores the system rule set in routing control device database 24 (step 616).

1.1.7 Removing a Peer from the Routing Control Device

The user will be able to remove a peer from routing control device 20 by supplying information that uniquely identifies the peer, such as IP address of the peer, autonomous system, peering interface or other unique parameters. Routing control device 20 will retrieve the existing system rule set for the peer from routing control device database 24 and use it to generate the configuration necessary to remove the peer from the routing system. Routing control device 20 uses the default access method for the routing system to apply the configuration and remove the peer. Finally, any data for the peer is removed from the system rule set and the resulting system rule set is stored in the routing control device database 24. Optionally, the peer configuration can be retained in the system rule set in routing control device database 24 for future use by being marked as inactive.

1.1.8 Device Deployment

Routing control device 20 may be deployed in a number of different manners for different purposes. Routing control device 20 may be deployed as a single standalone unit for operation in connection with one or more locations. Multiple devices may be deployed at a single location or at multiple locations to serve in a redundant fashion. If more than one device is talking to a routing system, the routing control device with the lowest IP address injects the best route into the routing system in accordance with BGP protocol. The priority of additional routing control devices is determined by the increasing magnitude of IP addresses.

To provide centralized management, multiple devices may also be deployed at multiple locations in a client-server relationship. In this type of relationship, routing control device 20 acting as the server identifies and locates the client devices and provides the clients with a set of policies as established on the server device for those locations.

1.2 Traffic Engineering Functions

1.2.1 Device Peering Setup and Removal

Routing systems 30 requiring traffic engineering functionality must be peered with routing control device 20 using an Internal Border Gateway Protocol (IBGP) session called a control peering session. The control peering session is the BGP4 peer relationship between the routing system 30 and the routing control device 20 used to update the routing system 30 with traffic-engineered routes. In a preferred configuration, routing control device 20 is peered to all routing systems 30 serving as egress points from the customer network or autonomous system 80. Multiple devices located at multiple egress points from the customer network may work together and share a common routing control device database 24 (not shown). A single IP address assigned to routing control device 20 is to be used as the neighbor address for all control peering sessions. Routing system 30 should supply a unique and static IP address as the preferred BGP neighbor address for establishing the control peering session between it and the routing control device 20. After initial configuration, the user can configure a standard inter-domain or IBGP peering session for the purposes of traffic engineering by supplying routing control device 20 with information that is a unique identifier for the peer on the routing system 30. Routing control device 20 will generate a system rule set based on the primary configuration policy and apply it to the routing system 30 using the default access method. To remove a traffic engineering configuration from a standard peering session, the user specifies the inter-domain or IBGP peer on the routing system by supplying a unique identifier. Routing control device 20 will retrieve the current system rule set, generate a routing system configuration to remove the inter-domain or IBGP peer, and apply the configuration to the routing system 30 based on the default access method.

1.2.2 Using BGP to Modify Routing Policy

Once a control peering session has been established, routing control device 20 controls routing in a routing system 30 by injecting routes with better metrics than the ones installed locally. Metrics used include local-preference, weight, multi-exit discriminator, and/or others as defined by the BGP protocol. The routing system 30 interprets these routes and installs them into its local routing table as long as the control peering session is active.

Figure 8:
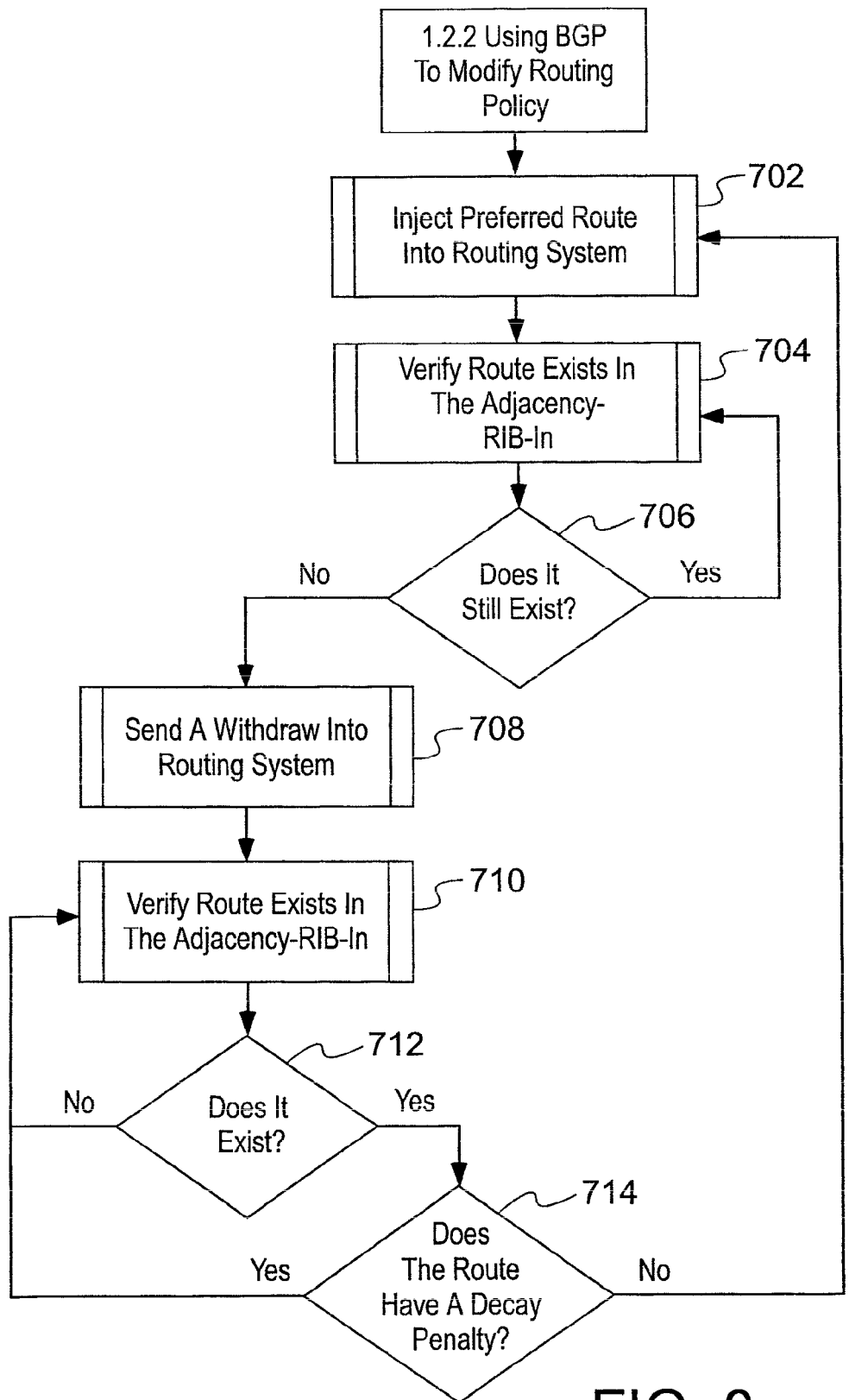
FIG. 8 is a flow chart diagram of a method for modifying routing policy of a routing system.

An adjacency-Routing Information Base-in (adjacency-RIB-in) is the total set of routes the routing system 30 receives from all BGP speakers, including routing control device 20 and all other BGP peers. Once a traffic-engineering route has been injected (FIG. 8, step 702), routing control device 20 must monitor the adjacency-RIB-in on the routing system 30 to insure the destination peer specified by the traffic engineered route maintains network layer reachability (steps 704 and 706). This may be done by polling the routing system using the default access method or by monitoring the unadulterated BGP update messages from each destination peer. If the routing system's 30 destination peer withdraws network layer reachability from routing systems 30 adjacency-RIB-in, routing control device 20 must immediately withdraw its corresponding traffic engineered route for this destination as well (step 708). Routing control device 20 should then inject a new traffic engineering route by selecting the next best destination peer after verifying that the destination peer still exists in the adjacency-RIB-in and waiting for a predefined hold down time (steps 710 and 712). Routes that are withdrawn from the routing control device 20 RIB start collecting a penalty that is reduced over time by using the exponential decay algorithm described in RFC2439. Once the half-life has been reached in the decay period, the previously withdrawn route can be used again (see step 714). Routing control device 20 can then reevaluate all potential destination peers, selecting the best route and inject a traffic engineered route into the routing system 30.

1.2.3 Frequency of Traffic Engineering

The user can define the frequency with which routing control device 20 controls routing updates being injected into the routing systems by supplying an interval timer for traffic engineering methods. If the user does not supply a metric for a given method, a default will be used. The default timer is based on the update period that achieves the best network stability for that traffic engineering method. Since routing control device 20 is simply a BGP peer using the standard protocol, if the peering session between routing control device 20 and the routing system 30 fails all modified routes are flushed from the routing system RIB.

1.2.4 Traffic Engineering Based on Load Sharing

Figure 9A:
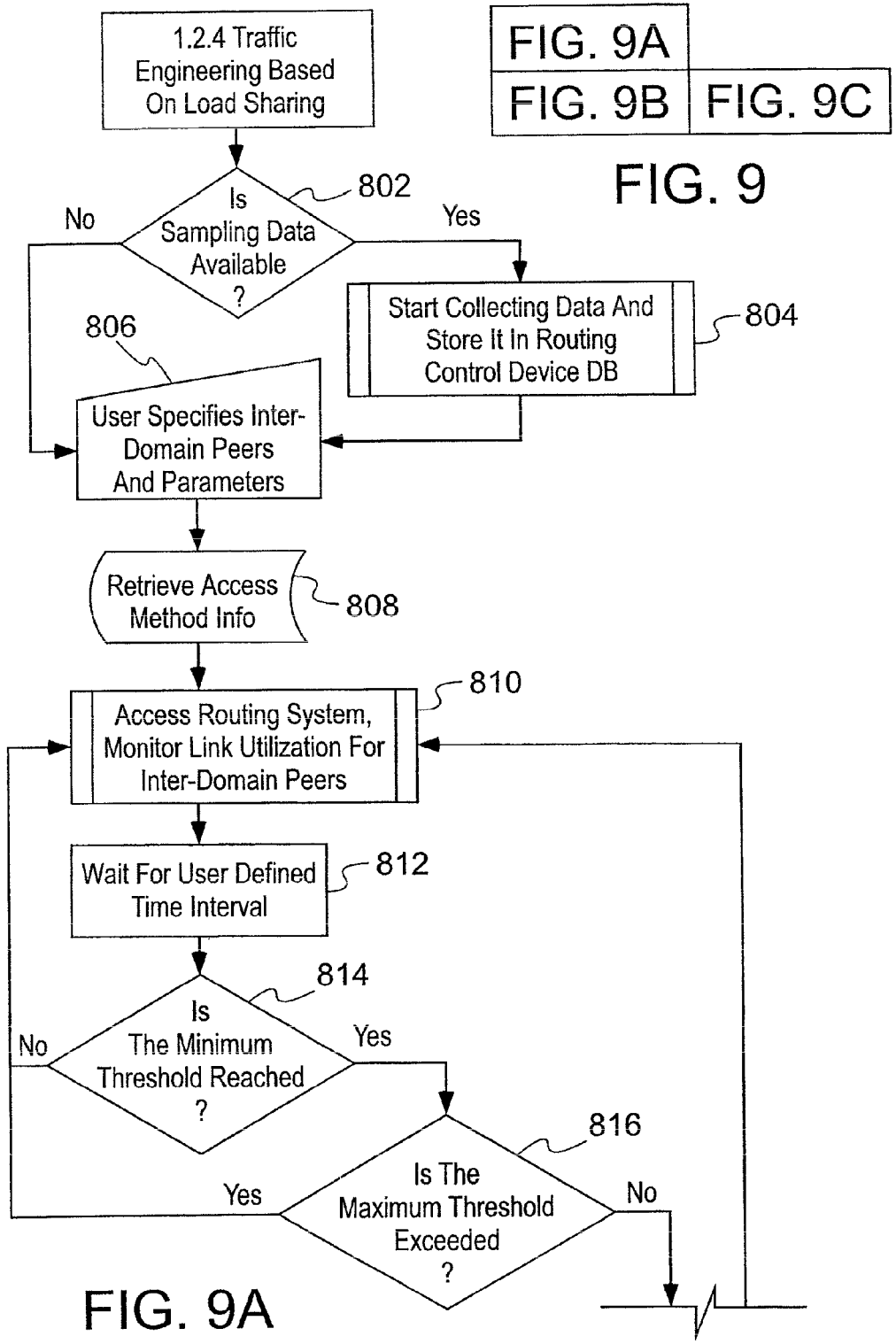
FIG. 9 is a flow chart diagram providing a method for load sharing among multiple peers.
Figure 9B:
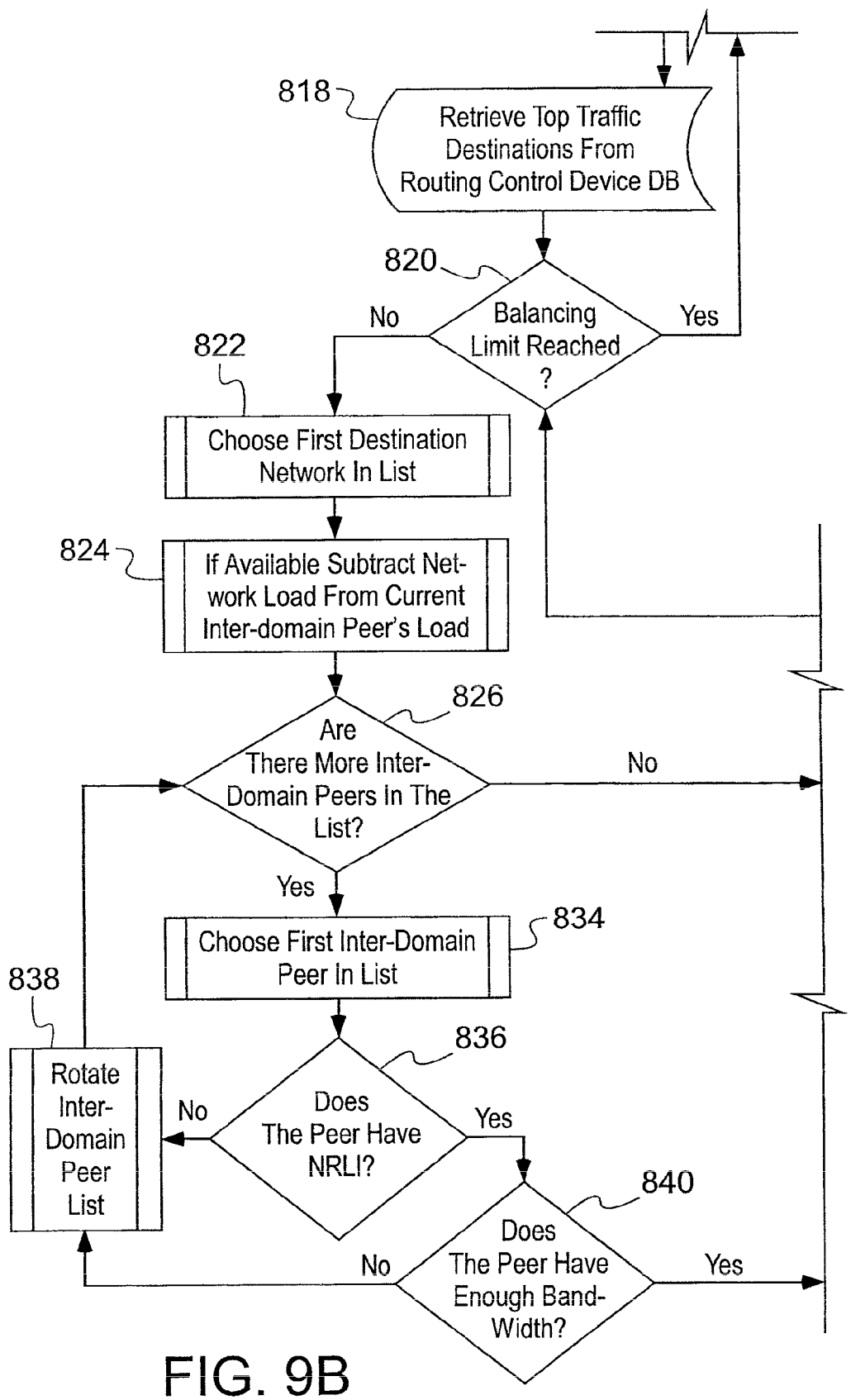
Figure 9C:
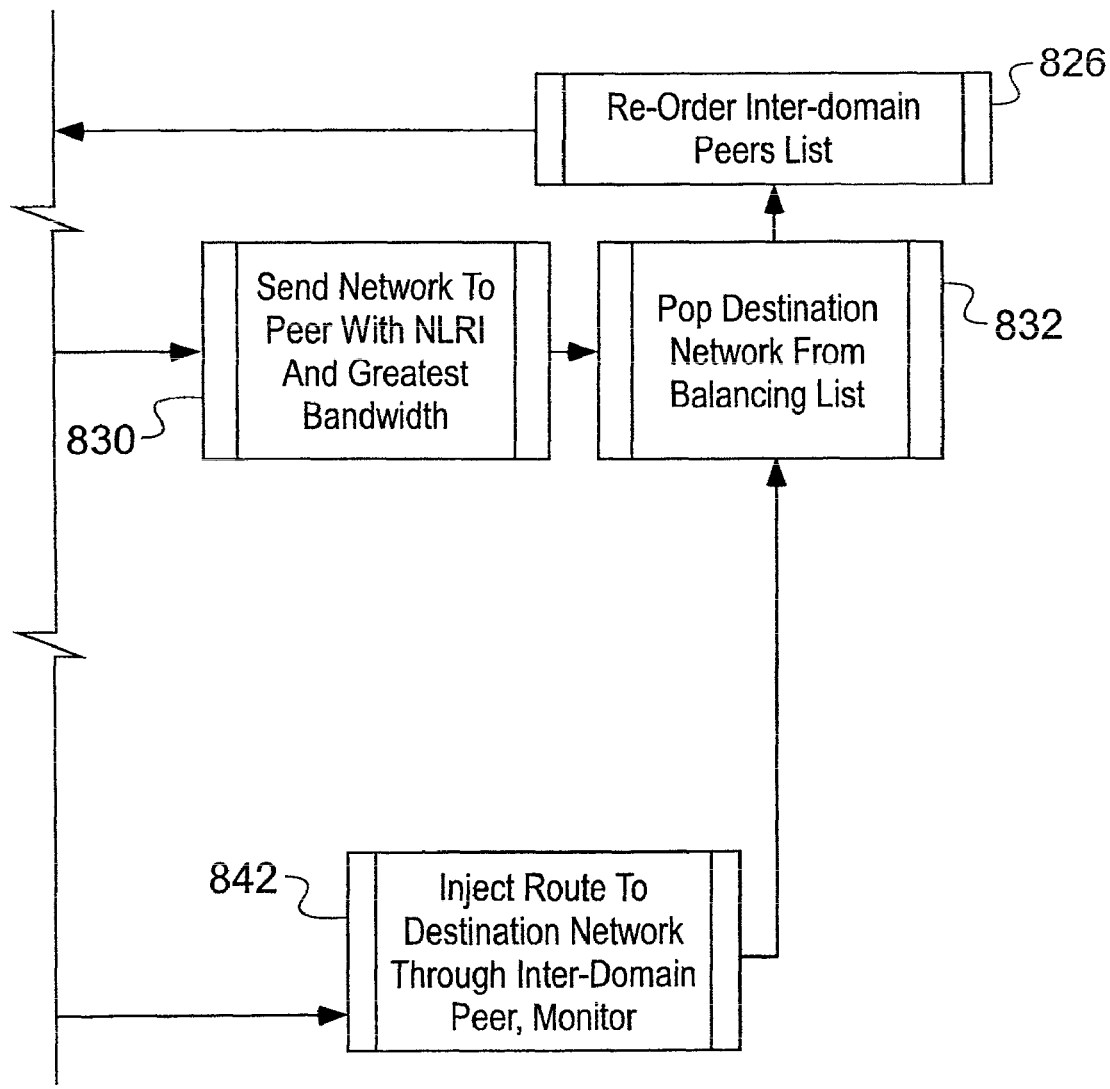

The user can request that routing control device 20 actively load share traffic across multiple inter-domain peers by supplying information that uniquely identifies each peer and a minimum utilization threshold at which the process should begin (see FIG. 9, step 814). Optionally, the user may specify a maximum threshold at which load sharing ceases (see step 816). To determine candidate networks destinations for load sharing, routing control device 20 determines the active traffic load by directly sampling traffic flows from the network, by accepting sampling data from of her systems, or by other deterministic or non-deterministic methods and stores the ordered results in the routing control device database 24. Traffic-sampling data is analyzed to generate the total amount of traffic per destination network (see step 804). This is accomplished by comparing each traffic flow's destination IP address to the routing system's 30 active routing table to determine the corresponding network route for the destination. A traffic flow consists of all data flowing between two endpoints that share a common session. The total amount of traffic destined for each network is then tallied and the results are sorted by quantity. This process is repeated as long as the box is expected to load share traffic. Over time, the results provide a list of the destinations with the largest traffic requirements for the routing system 30. As part of the load sharing method, routing control device 20 queries the routing system 30 using all necessary access methods (as described in 1.1.1) to monitor network utilization (see steps 808, 810 and 812). If the minimum threshold is reached (step 814) and the maximum threshold is not exceeded (step 816), routing control device 20 loads the sorted list of top traffic destinations from the routing control device database 24 (step 818). In the absence of sampling traffic or data, routing control device 20 alternates destination networks based on a heuristic designed to choose the most likely candidates for large traffic flows. Using the primary configuration policy, routing control device 20 load shares traffic based on available routing system resources. An ordered set of inter-domain peers to be balanced is generated from the IP addresses supplied by the user (step 806). In one preferred form, the first element of the set is the active peer for the largest destination network. To most appropriately load share across the available inter-domain peers, the results from a load sharing algorithm are used to select the destination peer for each network (see steps 834, 836, 838 and 840). First, the destination network's current traffic load figures are subtracted from its present destination peer's total traffic load figures (step 824). The destination network is then compared to each destination peer in the set in turn until a suitable path is found or the entire set has been traversed (see steps 828, 834, 836,838 and 840). To find a suitable path, the first destination peer in the set is chosen (step 834) and the network is verified to be reachable through it (step 836). If so, the destination peer's current traffic load is verified to insure sufficient bandwidth is available to handle the additional burden of the destination network (step 840). If the bandwidth is available the destination peer is chosen as the best path (step 849). If neither of these expectations are met, the next destination peer in the set is analyzed against the network using the same methods (step 838). The process is repeated for the destination network until an available peer can be found or the entire set has been traversed (see step 828). If no suitable destination peer is found, then the destination peer with network reachability and the greatest available bandwidth is chosen (step 830). Once a destination peer is selected, the network is routed over that peer by injecting a BGP route update into the routing system 30 with the next hop field set to the destination peer's address, using techniques as described in section 1.2.2. The peer set is then reordered so that the chosen peer becomes the last available element in the set and the next destination peer becomes the first available element in the set (step 826). This process is repeated for each destination network in the list up to the user-defined limit (see steps 820 and 832).

While the list of networks is constantly being updated, the actual load balancing routines only run at predefined or user defined intervals. Additionally, a user may supply a local configuration policy to define how traffic is balanced between inter-domain peers. If the minimum or maximum thresholds are attained, any previously balanced networks will be maintained in the routing table, but no new networks will be injected for load sharing purposes.

1.2.5 Traffic Engineering Based on Internet Performance

Figure 10A:
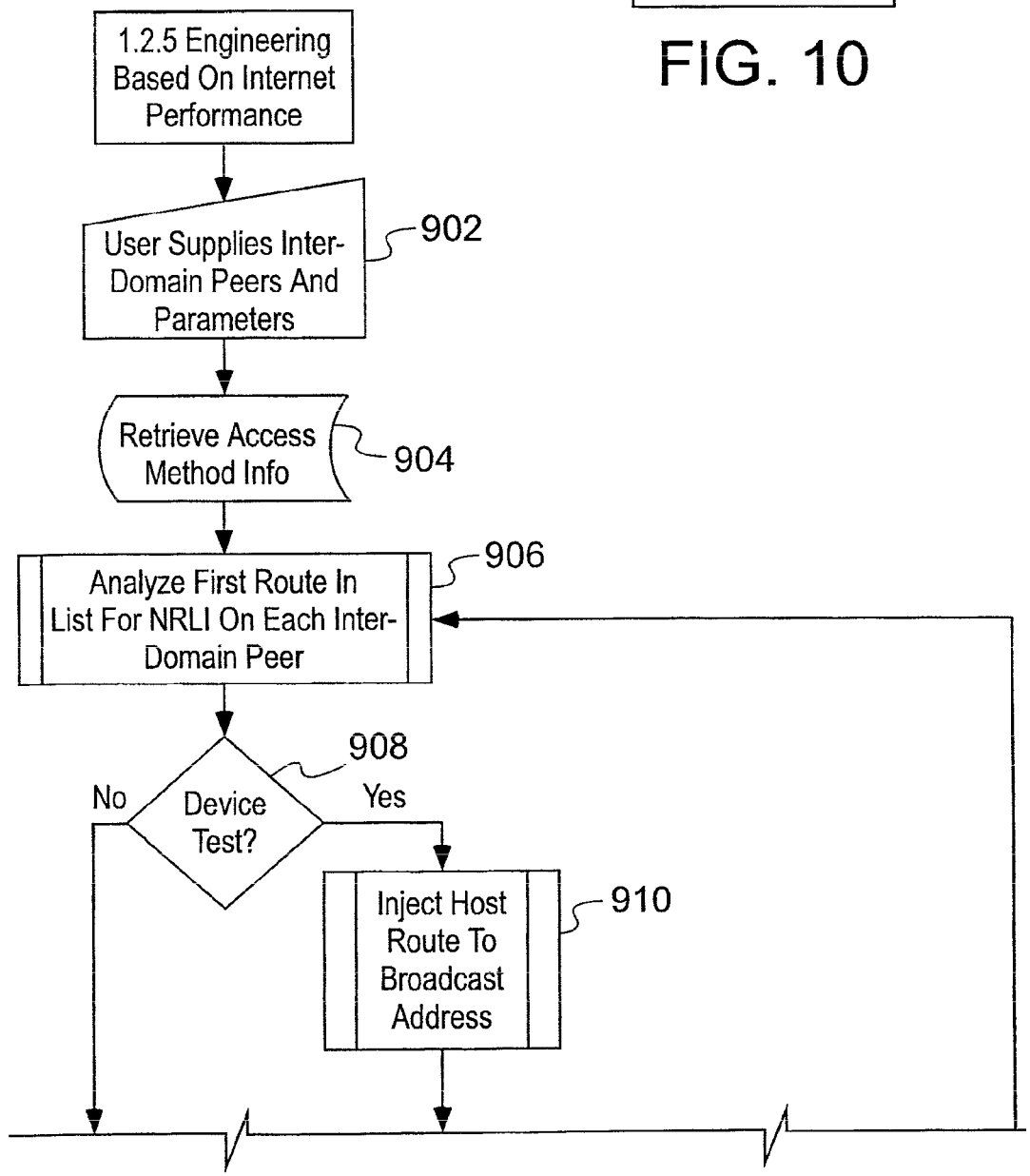
FIG. 10 is a flow chart diagram illustrating a method allowing for use of routing metrics alternative to standard BGP protocol metrics.
Figure 10B:
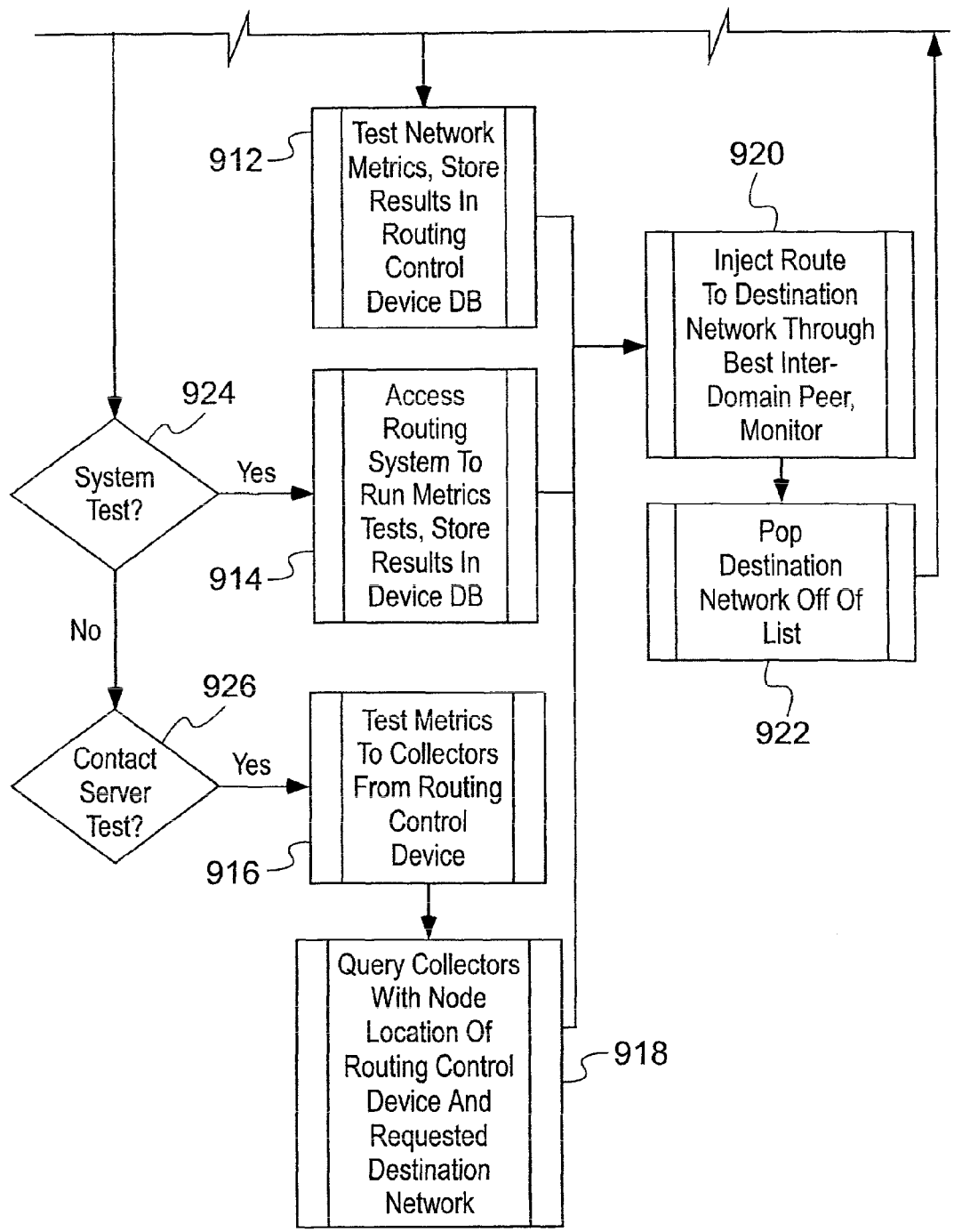
Figure 11:
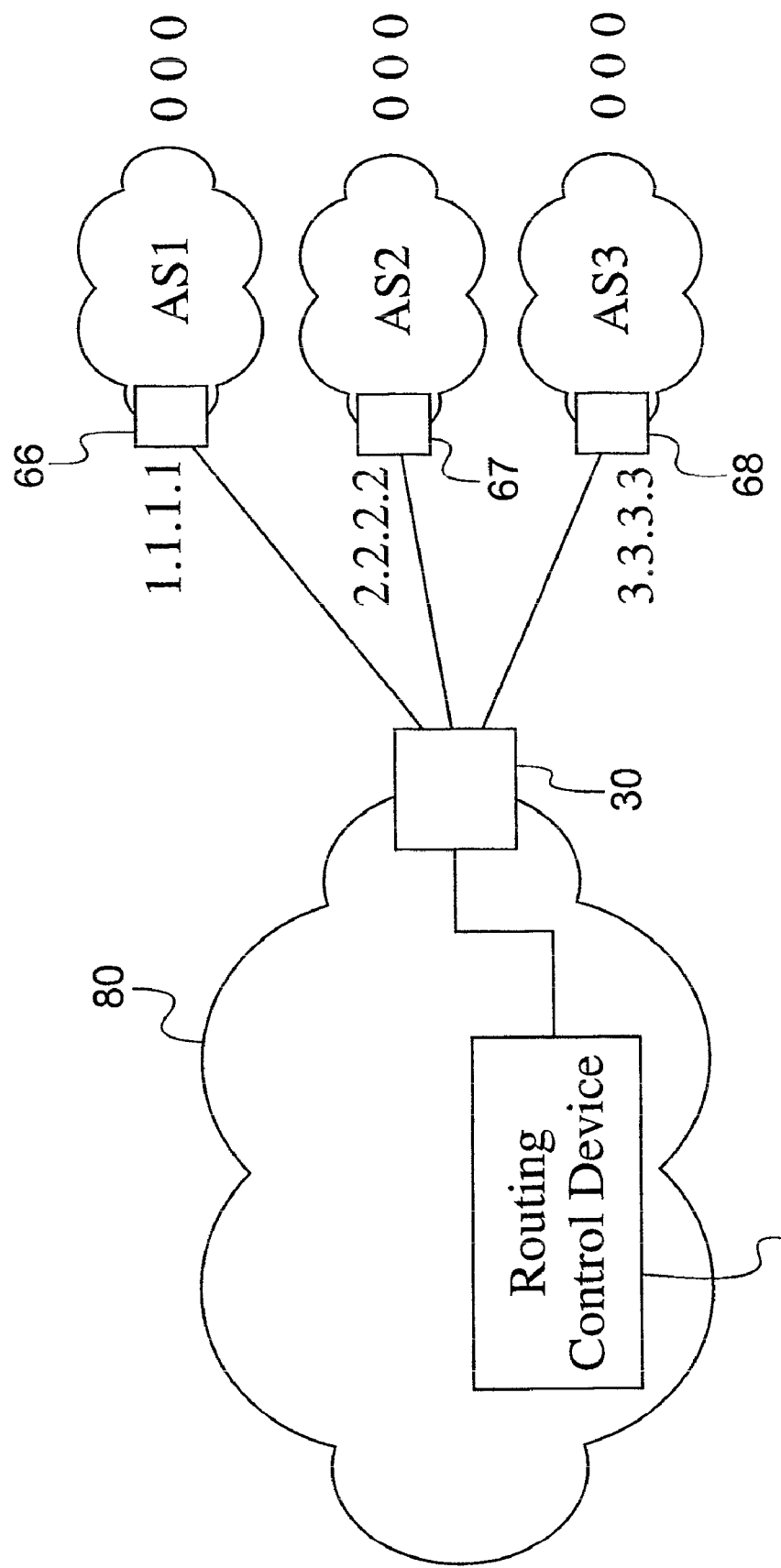
FIG. 11 is a functional block diagram providing a first computer network and routing peers associated with the first computer network.

The user can request routing control device 20 to route traffic based on metrics alternative to the standard BGP protocol metrics. First, the user supplies routing control device 20 with a set of destinations to test (FIG. 10, step 902). This set may be defined as individual destinations using names, IP addresses, URLs or other host identification tags or it may be defined as a sequential list of networks. A destination set may be a local user defined list, may be supplied by an external source, or may be generated by routing control device 20 using traffic analysis similar to the method described in section 1.2.4, above. Once the destination set has been defined, routing control device 20 must determine what peers have network layer reachability to the destination networks by examining the adjacency-RIB-in on the routing system 30 (steps 904 and 906). Routing control device 20 then builds a set of possible destination peers based on this information and tests each in sequence.

Routing control device 20 has three options for determining the best path to a destination network: 1) routing control device 20 may test performance metrics itself (step 908), 2) it may request that the routing system test performance metrics (step 924) or 3) routing control device 20 may query a central location containing a set of performance metrics (step 926) [see section 2.2.1, infra]. For routing control device 20 to test network blocks internally without affecting the current traffic flows to the destination, routing control device 20 first finds the corresponding network route for a host in the destination set and identifies a list of all possible destination peers for that network route. The route entry contains enough information for routing control device 20 to determine the broadcast address for the destination network. Routing control device 20 then injects into the routing system 30 being tested a host route (i.e., a network route with an all-one's network mask) to the broadcast address of the destination network with a next hop of the first destination peer in the previously identified list of possible destination peers (step 910). Routing control device 20 runs performance tests on the path through that peer. The results are stored in routing control device database 24 for trending purposes and the process is repeated for the next destination peer (step 912). After all possible paths have been tested a best path is chosen based on the performance metrics. For routing control device 20 to test metrics from within the routing system 30, routing control device 20 queries the routing system 30 with the default access method and uses the available routing system tests such as the TCP/IP ping or traceroute facility to determine best path by sourcing the tests through each destination peer in sequence (step 914). The results are stored in routing control device database 24 for trending and a best path is chosen. Finally, routing control device 20 may query a central server by first testing the metrics from routing control device 20 to the data collectors 90 associated with a central server 40 (step 916) and then supplying the central server with the set of destination networks or hosts to be tested (step 918). The central server 40 determines the best path based on the results of tests previously run from a central location, such as to the destination networks combined with the results of the path tests between routing control device 20 and a data collector 90 associated with the central server 40. (See Section 2.2, infra, and FIG. 2.)

In all three options, best path is determined by attempting to characterize the performance of the path through each destination peer. This performance is gauged on a weighted aggregate of the results of a series of tests, which may include any of the following factors: 1) response time, 2) hop count, 3) available bandwidth, 4) jitter, 5) throughput, and 6) reliability. In addition, the path performance metric generated by the central server 40 and data collectors 90 can be used as merely another test that is weighted and aggregated with other tests in selecting the best path to a given destination. Since the function of the tests is simply to determine best path new methods may be added in the future by simply defining the test method and adding the weight of the results to the scale. After the best path has been determined, routing control device 20 injects a route for the destination network into the routing system 30 with the next hop set to the address of the selected destination peer using techniques as described in section 1.2.2 (see steps 920 and 922).

In one embodiment, an expanded set of performance tests may be performed between two or more routing control devices at different locations. Using this expanded test method, routing policy can be engineered for data traversing between those locations. To achieve this type of engineering, routing control devices 20 perform a closed loop-test between each other. The closed-loop test runs by injecting host routes to the IP address of the remote routing control device with the next hop set to each potential destination peer in their respective routing systems. This method of testing allows routing control devices 20 to gather a greater amount of information since the flow of traffic can be controlled and analyzed on both sides of a stream. This method of testing is accomplished, in one forms using only routing control device resources.

1.2.5.1 Enhanced Testing Methodology

Routing control device 20, in one embodiment, employs enhanced testing methodologies that maximize the likelihood of receiving responses to test packets. Embodiments of the enhanced testing methodologies described herein feature one to three components. First, as to a given path, routing control device 20 probes the path to locate and define the characteristics of a target intermediate system for subsequent use by path metrics test modules. A second component involves the interleaved injection and testing of routes to reduce the time required to perform metrics tests on the paths associated with a given set of network prefixes. Lastly, the metrics test modules themselves incorporate checks to determine whether the properties of the previously defined path are still valid, or whether such path properties require re-computation.

1.2.5.1.1. Target Selection

A preliminary step associated with testing paths to destination networks in relation to at least one metric is the definition of a target intermediate system for each path. In one embodiment, after routing control device 20 has identified a target intermediate system for a particular path, it stores the IP address of the intermediate system and the number of hops to the intermediate system in association with a path identifier. In subsequent testing of the path, routing control device 20, in one embodiment, tests to the target intermediate system, as discussed more fully below, and analyzes the responses, if any, to the test packets to determine whether the properties of the path and target intermediate system should be recomputed.

In one embodiment, the target selection process for a path is performed only if no target intermediate system has been previously identified for a particular path or the execution of the metrics tests achieves an invalid result (see below). For example and in one embodiment, assuming target intermediate data is not stored persistently, routing control device 20 performs the target selection process upon start up or re-initialization. In addition, routing control device may also perform the target selection process as required for previously undefined paths before execution of the interleaved route injection and testing process discussed below.

The goal of the target selection phase is to determine the properties of the path and the target intermediate system. As discussed more fully below, routing control device 20, in one embodiment, uses hop-limited UDP packets configured to expire at the target intermediate system to determine individual path metrics. Accordingly, target selection allows for a determination of the hop on which to limit the test packets and the IP address from which responses should emanate.

In addition, the target selection process seeks to identify the last intermediate system in a path to a destination network. Accordingly, routing control device 20 can inject a host route to a particular destination network host corresponding to the path and employ a conventional traceroute utility (see below) directed to the destination network host to characterize the path and identify the target intermediate system. However, to minimize the effect of probing paths on legitimate network traffic, routing control device 20, in a preferred embodiment, identifies the target intermediate system by injecting host routes to the broadcast address of the destination network prefix and transmitting a series of hop-limited probe packets to the broadcast address of the destination network prefix.

The IP protocol uses the Time to Live (TTL) field to limit the distance a packet may travel before it expires and is discarded. According to the IP protocol, the TTL field in an IP packet header is decremented by one for each intermediate system the packet passes through. When a TTL value for a given packet reaches zero, the packet is deemed to have expired and is discarded. An Internet Control Message Protocol (ICMP) TTL expired error response is sent back to the source of the packet with a copy of the expired packet's IP header plus the first 8 bytes of the payload. See F. Baker, Cisco Systems, Inc., Network Working Group, "Requirements for IP Version 4 Routers," RFC 1812, June 1995. For example, a packet sent with a TTL value of three would be able to traverse three intermediate systems before expiring or "timing out." Per RFC 1812, the third intermediate system would discard the packet and send an ICMP response back to the sender. The sender can then determine the address of the third intermediate system by analyzing the source IP address of the ICMP response packet. Information included in the payload of the outbound test packet(s), and therefore in the payload of the ICMP response, allows the sender to send many different packets and still correlate unique outbound packets with inbound ICMP responses.

Van Jacobsen uses hop limited probes and the characteristics of the IP protocol to define a utility called traceroute that can determine the path a packet takes to reach a destination.

See Van Jacobsen, "Traceroute" (1988). The traceroute utility uses UDP packets sourced from unique source port, destination port pairs where the destination ports are high number ports not likely to be in use on the remote end system. If a port is not in use on an end host, the host will return an ICMP "port unreachable" response if it receives a packet on that port. The port information is returned in an ICMP packet and can therefore be correlated to an individual test. To define or characterize a path to a destination network, traceroute sends a series of packets where each succeeding packet's TTL value is incremented by one. The traceroute utility analyzes the "ICMP TTL expired" responses to determine the IP address of the intermediate systems in the path. For example, the source address of the ICMP response that corresponds to the UDP packet with a TTL of one is the IP address of the first hop in the path, and so on. The traceroute utility knows it has reached the target host when it receives an ICMP "port unreachable" packet from the end host.

As discussed above, routing control device 20, in one embodiment, uses a modified version of the traceroute utility discussed above to ensure that legitimate network traffic remains unaffected by the metrics test process. FIG. 13 sets forth a method allowing for the selection of a target intermediate system for a given path. The target selection process, in one embodiment, involves transmitting hop-limited probe packets to the broadcast address of the destination network (1102). In one embodiment, the routing control device 20, beginning with a TTL value of 1 (1104), utilizes two UDP packets per TTL value to allow for detection of per-packet load balancing, redirects and network loss (1106). In one embodiment, the probe packets are User Datagram Protocol (UDP) packets; however, other IP packet types can also be used, such as TCP packets. Since the probe packets are sent to the broadcast address associated with the network prefix, routing control device 20 can not expect to consistently receive a "port unreachable" or other ICMP type code three response allowing it to explicitly determine that the last intermediate system in a given path has been reached and to terminate the probing sequence. Since there is no guaranteed error response packet, routing control device 20 terminates the transmission of probe packets, if it receives any kind of ICMP type three response to any single UDP packet probe with any TTL (1112) or no response to two consecutive UDP packet probes with the same TTL (1108). Specifically, after routing control device 20 transmits two UDP probe packets for a given TTL, it waits for ICMP responses, if any, to the probes. If routing control device 20 does not receive a response to either probe packet (1108) within a threshold period of time (e.g., 5 seconds), it terminates the probing sequence. In one embodiment, the timeout period is a configurable parameter.

If routing control device 20 receives two responses, it compares the source IP addresses of the ICMP responses to determine whether they are the same (1110). If the ICMP responses were sourced from different intermediate systems, routing control device 20 marks the path as being multi-pathed (1111), stores the IP address(es), ICMP type code, and TTL value associated with the response(s) (1114). If only one response is received, routing control device 20 assumes a network loss as to the remaining probe packet, bypasses a comparison of the source IP addresses of the ICMP responses, and, assuming the response is a TTL expired response, stores the IP address(es), ICMP type code, and TTL value associated with the response(s) (1114). If at least one response packet is received, the ICMP response type(s) are analyzed (1112). If the ICMP response type is a "TTL expired" response (Type 11), routing control device 20 increments the TTL value for the probe packets (1116) and continues the probing sequence. Otherwise, routing control device 20 discontinues the probing sequence. Routing control device 20, however, stores the ICMP type code of the response that triggered termination of the probing sequence (the terminating response) (1118).

After terminating the successive transmission of probe packets with incremented TTL values, routing control device 20 chooses the last non-repeating hop and stores the TTL and IP address associated with the chosen intermediate system. A repeating hop is an intermediate system that responds to two or more UDP packet probes that were initially transmitted with different TTL values. This usually indicates a routing loop and is likely to happen with the target selection process described herein, as the packets are destined for broadcast addresses. In one embodiment, routing control device 20 removes from the list of IP address-TTL pairs generated during the probe transmission process all duplicate IP addresses (1120). In the case where an IP address is associated with more than one TTL value, the IP address-TTL value pair having the larger TTL value is removed. Routing control device 20 then selects the intermediate system/IP address associated with the largest TTL value (1122).

However, as this is not enough to guarantee that the appropriate intermediate system in the path has been found, routing control device 20 executes certain validity tests based on the route information available to it. If the terminating ICMP response was a host unreachable error (ICMP type 3 code 1) (1124), then routing control device 20 assumes that it has reached the end of the path and uses the selected intermediate system as the target intermediate system for subsequent testing of the path. If the type of the last ICMP packet offers insufficient information as to the termination point of the path, however, then routing control device 20 resorts to route information in the BGP tables to validate the selected intermediate system. As FIG. 13 provides, routing control device 20 finds the BGP route matching the network prefix corresponding to the broadcast address used in the probe packets and analyzes the AS path to identify the last and second-to-last AS in the path (1128). By BGP convention, the last AS in the path is the AS that sourced the network prefix. Routing control device 20 also finds the BGP route matching the IP address that was determined to be the lost non-repeating hop (1126). If the source AS of the BGP route matching the IP address of the last non-repeating hop is the same as the source AS of the network prefix AS path, then routing control device 20 can determine that the lost non-repeating hop IP address is at least in the administrative domain of the prefix (1130) and uses the last non-repeating hop as the target intermediate system for subsequent metrics tests. If the source AS of the BGP route corresponding to the last non-repeating hop matches the second to lost AS in the network prefix AS path, then routing control device 20 assumes the last non-repeating hop is associated with the provider to the administrative domain of the network prefix and uses the last non-repeating hop as the target intermediate system in subsequent metrics tests. If none of these cases are met, then routing control device 20 assumes a failure and tries to re-compute path properties (1132).

1.2.5.1.2. Route Injection and Testing Process Flows

Once routing control device 20 has determined the network prefixes that need to be engineered, either through static definition by a network administrator or dynamically through network analysis, routing control device 20 tests each possible network path to the set of network prefixes using a predetermined set of metrics tests. Routing control device 20, in one embodiment, accomplishes this by injecting a host route matching the broadcast address of the network prefix into the local BGP domain and executing the set of metrics tests to the broadcast address, as discussed below. Routing control device 20 then repeats this process for all paths to the network prefix. Specifically and in one embodiment, each injected route has NLRI set to a single available nexthop. For example, if a given network prefix (e.g., 10.0.0.0/24) is available through a path using peer A 66 whose nexthop is 1.1.1.1 and a path through peer B 67 whose nexthop is 2.2.2.2 then routing control device 20 will inject a route to 10.0.0.255/39 with a nexthop of 1.1.1.1 and wait for the route to propagate through the local BGP domain. Once the route has propagated through the local BGP domain, routing control device 20 tests the path through peer A 66 by sending test packets with a destination address of the broadcast address of the network prefix being tested. After testing of the particular path is completed, routing control device 20 stores the results in a database, and injects a new host route for 10.0.0.255/32 with a nexthop of 2.2.2.2. Again, routing control device 20 executes the metrics tests and stores the results for the second path. Routing control device repeats this process for all possible network paths to the network prefix, making sure to withdraw the last-injected host route for the network prefix.

Routing control device 20, in a preferred embodiment, uses an interleaved route injection and testing method to ensure enough time passes for injected test routes to propagate throughout the local BGP domain, before conducting path metric tests using such host routes. In one embodiment, routing control device 20 segregates unique network prefixes into two or more groups and sorts the set of test routes by both the corresponding network prefix and grouping of network prefixes (See, e.g., Table 12 and discussion below). The number of prefixes allocated to each group, in one embodiment, is determined by dividing the total number of network prefixes to be tested by the number of concurrent testing resources available. In another embodiment, the number of network prefixes in each group is determined by a configurable parameter limited by the number of concurrent testing resources. Routing control device 20, according to the grouping of network prefixes, injects a set of routes from a first group of network prefixes before testing a previously injected set of routes from a previous group. This technique allows for injected routes to propagate throughout the BGP domain during the natural time delay associated with execution of the metrics tests on a set of previously injected test routes. As FIG. 14 shows, this is accomplished by injecting the routes for the next interleave group before initiating the metrics tests on the current group. For example, if routing control device 20 is testing ten unique prefixes with two paths each, routing control device 20, in one embodiment, may divide the network prefixes into two groups of five network prefixes. The five network prefixes in the first group would be injected into the local BGP domain destined for their respective first available nexthops, or paths. Routing control device 20 waits for a small period of time to allow these first set of routes to propagate. Although certainly contemplated by some embodiments of the present invention (above), continually waiting for route propagation before testing is suboptimal; so, before testing the paths just inserted, routing control device 20 inserts the next group of prefixes to their respective first paths as well. Therefore, the time spent testing the paths in the first group allows the paths for the second group to propagate in time for the metrics test to be run on the second group. After the tests on the first path for group one have been completed the second set of paths for the first group is injected before the initiating the tests on the first path set for group two. The process of inserting the next group's prefixes before testing the current group's path/prefix pairs is repeated until all paths in all groups have been tested. If the test time is shorter than a threshold period of time, routing control device 20, in one embodiment, verifies that the last route in a group has propagated by using Simple Network Management Protocol (SNMP) to query the routing table of the routing device 30 through which the test packets ultimately egress.

FIG. 14 sets forth a method that interleaves injection of test routes and the testing of previously injected routes according to an embodiment of the present invention. As FIG. 14 illustrates, routing control device 20 retrieves the network prefixes to be engineered (1002) and fetches the paths to the network prefixes obtained from NLRI information (1004). In one embodiment, routing control device 20 determines whether a target intermediate system has been previously defined for each path and, if not, executes the target selection process for such paths. Routing control device 20 then segregates the network prefixes into two or more groups (1006). In one embodiment, the number of network prefix groups is determined by dividing the number of network prefixes by the number of available sockets (which is limited by the operating system kernel or, artificially limited to a smaller number to conserve resources (e.g., 200 sockets)). For example, 1000 network prefixes and 200 available sockets would result in 5 network prefix groups. For didactic purposes, Table 12 sets forth an exemplary grouping of network prefixes. As Table 12 illustrates, the network prefixes have varying numbers of network paths. Each path in a particular group corresponds to a path set. For example, Group 1 includes three levels of path sets with the lowest level path set including a single path (Path3).

As discussed above, routing control device 20 injects a test route for the first set of paths in the first group (1010, 1012, 1014) and, in one embodiment, waits for a small period of time to allow for propagation of the injected routes throughout the BGP domain (1016). Routing control device 20 then injects a first set of test routes for the second interleave group (1018, 1020). Routing control device 20, starting with the first network prefix in the first interleave group (1022, 1024), then tests the path as discussed below (1028). Routing control device 20, in one embodiment, first determines for the given path set level, whether there is a path associated with the network prefix (1026). As FIG. 14 shows, routing control device 20 tests each path in the current interleave group and path set (1030, 1032). Routing control device 20 then proceeds to the second group (1034, 1036), but first injects test routes for the subsequent group (1038, 1018, 1020, 1040, 1042, 1044, and 1046). Routing control device 20 progresses through the groups in a circular fashion changing the path set level at each full cycle through the interleave groups (see 1034, 1050, 1052) until all routes have been tested.

As discussed below, in a preferred embodiment, routing control device 20 tests paths to a given network prefix by sending test packets addressed to the broadcast address associated with the network prefix. Using the broadcast address as the destination of metrics tests allows routing control device 20 to inject routes into the BGP domain that will not affect normal traffic flows while still making it possible for the tests to be preformed on each path. The broadcast address is normally used only by systems local to the network for administrative purposes. Since routing control device 20 tests remote networks, it can safely change the routing of this single address in the local BGP domain because there should be no legitimate network traffic destined for a remote broadcast address.

1.2.5.1.3. Test Modules

Test modules implemented by routing control device 20, in one embodiment, send a series of hop-limited UDP packets sent to the network prefix's broadcast address to determine path characteristics. Although the test modules may use the computer network address of a destination network host, use of the broadcast address is preferred as the injection and testing of routes using the broadcast address ensures that legitimate network traffic remains unaffected. In one embodiment, the test packets are configured to expire at the target intermediate system previously identified during a target selection process. In an IP network environment, this can be accomplished by setting the TTL value of the test packets to the number of hops to the target intermediate system. In one embodiment, the hop number on which to expire the test packets and the expected IP address of the response are determined by a previously executed target selection process, discussed above. By limiting the TTL of a test packet thereby forcing the packet to expire at the target intermediate system, routing control device 20 is more likely to receive an ICMP error response since intermediate systems are required by RFC1812 to respond to a TTL timeout. Moreover, such hop-limited test packets reduce the perception that the packets are associated with intrusive or suspicious activities since packet expiration is usually processed by a system before other packet validity checks that would report the error, such as those done by a firewall or an application layer process. For example, a hop-limited test packet expiring at a network gateway triggers an error at a lower level process in the IP stack of the gateway. Accordingly, the gateway drops the packet and responds with a TTL expired ICMP response. The packet never reaches a firewall process or other application that operates in connection with higher levels of the protocol stack associated with the gateway and that would trigger and alarm due to the error, or would prevent transmission of a response.

Test modules can calculate any number of different types of industry standard measurements, such as latency, jitter, loss or available bandwidth, by varying the size of the test packets and/or the quantity transmitted. Results are computed for each path and are stored by routing control device 20 for future path comparisons. However, if the path changes after the target selection phase has completed, the results of the metrics tests will be invalid. Therefore, if the metrics tests detect a path change the results for the current tests should be invalidated and the target selection process should be re-initiated. FIG. 15 sets forth a method associated with metrics testing to determine whether the characteristics of the target intermediate system in a given path should be recomputed. One way metrics tests can detect a path change is by analyzing the source IP address of the ICMP error response (1204). If the source address of the error packet is different from the previously computed source address then the metrics test knows the path has changed and requests that the target selection process recompute the path properties (1210). Also if the ICMP type of the response packet is not of ICMP type 11, TTL expired, then the path has changed and will need to be recomputed (1206). A metrics test will also request that the target selection process recompute path properties, if routing control device 20 does not receive any ICMP error packets for all the probes it sends in a given measurement cycle (1208).

As discussed above, after the best path has been determined for a given network prefix, routing control device 20 injects a route far the destination network into the routing system 30 with the next hop set to the address of the selected destination peer using techniques as described in section 1.2.2.

1.2.6 Traffic Engineering Based on Time of Day

The user can initiate traffic engineering based on the time of day by specifying an action, a time, and, in some embodiments, a destination set. The action may be procedural or specific depending on the desired outcome. A procedural action is one that deals with the overall routing policy in routing control device 20. For example, a user may request that routing control device 20 cease traffic engineering for all destinations between 1 AM and 2 AM. A specific action is one that deals with a predefined set of destinations that are supplied by the user. For example, the user may request that a set of destinations use peer A during business hours and peer B at all other times. Routing control device 20 identifies and attempts to resolve inconsistencies between multiple time-of-day policies. Once valid time-of-day engineering is determined, routes that conform to the policy are injected using techniques as described in section 1.2.2.

1.2.7 Explicit Traffic Engineering

Explicit traffic engineering allows the user to explicitly set a policy regardless of peer load or path metrics. For example the user can specify that all traffic to a destination network always exit through a given peer. After verifying that the route has valid network layer reachability through the destination peer, routing control device 20 will inject a route for the network with the next hop set to the destination peer. If the peer does not have reachability to the network, routing control device 20 will not inject the route unless the user specifies that the policy is absolute and should not be judged based on network layer reachability. Explicit traffic engineering routes are injected into the routing system(s) 30 using techniques as described in section 1.2.2.

1.2.8 Ingress Traffic Engineering

Part of the primary configuration policy defines how local network announcements are made to other autonomous systems. These announcements influence the path ingress traffic chooses to the set of local networks and routing systems for the user's autonomous system. If a user wishes to modify network advertisements in order to influence inbound path selection, the local configuration policy is defined so as to modify outbound route advertisements to inter-domain peers. Modifications to the outbound route advertisements include BGP techniques such as Multi-Exit Discriminators (MEDs), modification of the AS Path length, and network prefix length adjustment selected from a template of available modification types. This local configuration policy is uploaded as part of the primary routing configuration policy as described in section 1.1.3.

1.2.9 Soft Network Layer Reachability Information

In one embodiment, routing control device 20 allows for more granularity in load sharing and other traffic engineering processes than otherwise available using standard Network Layer Reachability Information (NLRI). BGP updates for a given network prefix must contain a valid network layer reachability information (NLRI) field. Routing control device 20 uses the information in the NLRI field to determine to where traffic flows destined for a given network prefix are capable of being routed. In one embodiment, routing control device 20 operates on the assumption that, if a parent network is reachable via a given nexthop, all subnets of that parent should be reachable via the same nexthop. Routing control device 20 uses this concept called soft NLRI (SNLRI) to enhance various traffic engineering processes discussed herein.

When traffic engineering, routing control device 20, by default, inserts routing updates to match the originally advertised prefix of the network, as it exists in the local BGP table. However, the larger the prefix the less accurate any performance measurement or load sharing decision will be due to the increased number of hosts in the prefix. In order to be more accurate in performance based (see Section 1.2.5) or load sharing routing updates, a network administrator may configure routing control device 20 to engineer routes based on a specified network mask size, as opposed to the network masks associated with standard NLRI address information. In one embodiment, routing control device 20 may effectively increase the network mask size of a given prefix by injecting routes associated with a single or multiple soft NLRI (SNLRI) subnets of the network prefix being engineered.

In a preferred embodiment, routing control device 20 applies certain rules when engineering SNLRI routes. Each SNLRI subnet of a given network prefix may have different nexthop information as long as there exists a corresponding parent route with the same nexthop in the BGP table of routing control device 20. Furthermore, a SNLRI route may not be injected if a more specific naturally occurring NLRI subnet route with the same prefix and mask length as the engineered SNLRI route already exists in the routing table. For example, routing control device 20, engineering SNLRI routes for a network prefix of 192.168.0.0/16 down to a /17 network mask (breaking the prefix into SNLRI prefixes of 192.168.0.0/17 and 192.168.128.0/17), first determines whether a naturally occurring NLRI route for either prefix exists in the BGP routing table. If a natural route exists for 192.168.128.0/17, for example, routing control device may inject a route for the 192.168.0.0/17 network prefix, but not both prefixes. Unless prohibited by the previous caveats, routing control device 20 injects SNLRI routes to cover the entire range of the parent network prefix. For example, routing control device 20, engineering a standard prefix of 192.168.0.0/23 to a /24 network mask, injects routes for 192.168.0.0/24 and 192.168.1.0/24 unless one of these routes already exists as a naturally occurring route. Additionally, if routing control device 20 injects a SNLRI subnet route using the process outlined in 1.2.2, routing control device 20 monitors the parent route with the same NLRI information as the engineered SNLRI subnet route and removes the engineered SNLRI route(s) should the parent route be withdrawn. Still further, although the foregoing examples effectively increase the network mask by one bit, routing control device 20 can engineer SNLRI routes for more specific subnets. For example, routing control device 20 can engineer SNLRI routes for a network prefix having a /16 network mask down to, for example, /24 network prefixes.

As discussed above, soft NLRI can be used in the load balancing processes described above. In one embodiment, routing control device 20 allows a network administrator to configure load balancing of network prefixes down to a given subnet mask (e.g., /24), if possible. In one embodiment, routing control device 20 for a /16 network prefix, for example, determines the traffic load to all /24 subnets of the parent network prefix and performs the load sharing process with respect to each /24 subnet. SNLRI may also be used in connection with other network traffic engineering processes, such as performance-based traffic engineering (see Section 1.2.5) and explicit traffic engineering (see Section 1.2.7).

1.2.10 Precedence of Traffic Engineering Rules

When multiple traffic engineering methods are configured, there is potential for conflict between those methods. In one embodiment, the priorities for traffic engineering methods for routing control device 20 is: (1) Time of day traffic engineering has highest precedence; (2) Explicit traffic engineering has second precedence; (3) Performance traffic engineering to a limited set of destinations identified by the user has third precedence; and (4) Load sharing traffic engineering has fourth precedence. For third precedence, if the results of a general load-balancing test would negate the results of a metrics based update for a specific route, then the load balancing update for that route will not be sent.

Other embodiments may include precedence methods that contain user-defined priorities, precedence methods based on IGP routing protocols such as OSPF or IS-IS, or precedence methods based on value-added functionality additions.

1.2.11 Additional Methods for Traffic Engineering

The design of the routing control device 20 is extensible such that additional methods for traffic engineering may be added by defining the method as a module for inclusion into the routing control device 20. Methods for traffic engineering may include: interior Gateway Protocol Analysis, enforcement of Common Open Policy Service (COPS), enforcement of Quality of Service (QoS), arbitration of Multi-protocol Label Switching (MPLS), and routing policy based on network layer security.

1.3 Monitoring and Management Functions 1.3.1 CLI Monitoring and Management

Routing control device 20 includes a command line interface that allows the user to monitor and configure all parameters. The command line interface accepts input in the form of a text based configuration language. The configuration script is made up of sections including general device parameters and peering setup, policy configuration, load balancing configuration, and traffic engineering configuration. Routing control device 20 also provides multiple methods for access and retrieval for the configuration script. The command line interface also allows the user to manually query routing control device 20 parameters such as routing tables and system load.

1.3.2 Web-Based Monitoring and Management

The user may enable a locally run web server on routing control device 20 that allows complete control and reporting functions for routing control device 20. Configuration consists of four main areas. The user may configure routing policies, load balancing functions, traffic engineering functions, and general device parameters. All configurations entered into the web interface are translated into a routing control device 20 configuration script format that is compatible with the command line interface. The web interface also reports on all aspects of routing control device 20 operations and statistics that have been collected. The user may view routing statistics such as currently modified routes, statistics on response times, and route churn. Routing control device 20 also reports on traffic statistics such as peer utilization and traffic levels by Autonomous System. Finally, routing control device 20 reports on routing system health statistics such as processor load and free memory.

1.3.3 Event Management

Routing control device 20 keeps a log of events. This log may be viewed locally on routing control device 20 or is available for export to an external system using methods such as the syslog protocol. This log tracks events such as routing updates, configuration changes to routing control device 20 or systems, and device errors.

1.3.4 Management Information Base

Routing control device parameters and system variables are capable of being queried using the Simple Network Management Protocol. A vendor-specific Management Information Base (MIB) located in the routing control device 20 supplies access to system statistics and information useful for network management applications.

2.0 Exemplary Deployment Configurations

The functionality described above can be deployed in a variety of configurations. For example, routing control device 20 can be deployed in a stand-alone configuration or as part of a centrally managed service. In addition, routing control device 20 can operate in connection with a centralized routing control database 42 storing routing path information gathered by a plurality of data collectors 90 connected to an autonomous system (see FIG. 2). Moreover, the functionality described herein can be incorporated into a centralized routing policy management service requiring no equipment at the customer's site.

2.1 Functionality in an Internet Appliance

2.1.1 Basic Functions of the Appliance

As an appliance, routing control device 20 is a standalone box that runs on a kernel based operating system. The kernel runs multiple modules, which handle the individual tasks of routing control device 20. For example, the appliance may comprise a Linux-based server programmed to execute the required functionality, including an Apache web server providing an interface allowing for configuration and monitoring. Modules are proprietary code that implements the policy and engineering functions described above. Additionally, the kernel handles system functions such as packet generation and threading. Routing control device 20 includes one or more network interfaces for peering and traffic sampling purposes. An included BGP protocol daemon is responsible for peering and for route injection. A web server daemon provides a graphical front end.

2.1.2 Managed Service

A managed service is defined as the purchase of a defined set of capabilities for a monthly recurring charge ("MRC"). The company owns all hardware, software, and services required to operate such capabilities, and costs of which are part of the MRC. Customers bear minimum up front costs and pay for only the services they use.

2.1.2.1 Customer-Premise Managed Service

Routing control device 20 resides at the customer site, but is run centrally at the Routing Control Center (ARCC®) 25. Through a graphical user interface presented by a web server at the RCC 25, the customer, using an Internet browser, directs the RCC 25 to conduct changes to the appliance 20 on their behalf. The RCC 25 connects directly to the customer premise appliance 20 in a secure manner to modify the modules as required. The customer is able to monitor the system through a Web interface presented by the RCC 25 and view reports on network statistics.

2.1.2.2 Virtual Managed Service

Routing control device 20 or the functionality it performs resides and is run centrally at the Routing Control Center 25. In this farm, routing control device 20 becomes an IBGP peer with customer systems through an arbitrary network topology to control customers' routing policy at their location. Customers connect to this service through a dedicated, secure connection, using a graphical Web interface to interact with the RCC and monitor the impact of this service on their network connections.

2.1.3 Value-Added Enhancements

Both appliance and managed service customers are able to enhance the functionality of their appliances. These enhancements may include further functionality additions, periodic updates of data used by the appliances as part of the policy engineering process, and subscription to centralized services.

2.1.4 Technology Licenses

In one form, the functionality performed by routing control device 20 can be packaged as a stand-alone set of software modules that third-parties may implement on their own platforms. For example, a third party may license the traffic engineering functionality described herein. For a fee, the third party will be able to integrate the technology into its product or service offering, which may include the outsourcing of all or part of the managed services solution.

2.2 Using the Appliance for a Global Routing Policy Service

In addition, the Routing Control Center 25 may be a source of Internet Routing policy data for routing control devices 20 at customer autonomous systems 80.

2.2.1 Gathering Routing Policy Information

Routing control device 20 is capable of querying a central server 40 to determine network topology and path metrics to a given destination set. This central server 40 is a device designed to build a topological map of the Internet using a plurality of data collectors 90. These data collectors 90 are placed in strategic locations inside of an autonomous system 80. In a preferred form, each data collector 90 will be located at the maximum logical distance from each other data collector. An example of a preferred collector configuration for the continental United States would include a minimum of four data collectors (see FIG. 2). One data collector 90 is placed in an east coast collocation facility. One data collector 90 is placed in a west coast collocation facility. Two data collectors 90 are placed in collocation facilities located centrally between the two coasts, (for example) one in the north and one in the south. This allows the data collectors to characterize all possible network paths and metrics within the autonomous system 80.

The data collectors 90 build sets of destination network routes to be analyzed by enumerating a list of all or a portion of routes received from a BGP session with a routing system within the subject's autonomous system 80. A partial set of routes will minimally include provider and customer-originated networks. The data collectors 90 then test the path to each network in the list by using a method similar to the TCP/IP traceroute facility as described below. This involves sending packets to the destination host with incrementing time to live (TTL) field values. The first packet is sent with a TTL of 1. When it reaches the first intermediate system in the path, the intermediate system will drop the packet due to an aged TTL and respond to the collector with an ICMP packet of type TTL exceeded. The data collector 90 will then send a second packet with the TTL set to two to determine the next intermediate system in the path. This process is repeated until a complete intermediate system hop-by-hop path is created for the destination network. This list is the set of all ingress interfaces the path passes through on each intermediate system in route to the destination network.

The data collector 90 then determines the egress interfaces for each intermediate system in the path as well. Network transit links can be generalized by classifying them as either point-to-point or point-to-multipoint. When the data collector 90 maps the intermediate system hop-by-hop path for the network destination, it is really receiving the ICMP response that was sourced from the ingress interface of each intermediate system in the path. Based on the IP address of the ingress interface of each intermediate system, the data collector 90 will use a heuristic method to determine the egress interface of the previous intermediate system. Due to the design of the TCP/IP protocol, the IP address of the ingress interface on any intermediate system in a path must be in the same logical network as the IP address of the egress interface of the previous intermediate system in the path. To find the exact address of the egress interface, the data collector 90 first assumes that the link is a point-to-point type connection. Therefore, there can be only two addresses in use on the logical network (because the first and last available addresses are reserved for the network address and the network broadcast address, respectively). The data collector 90 applies a /30 network mask to the ingress interface IP address to determine the logical IP network number. With this information the data collector can determine the other usable IP address in the logical network. The data collector 90 assumes that this address is the egress interface IP address of the previous intermediate system in the path. To verify the assumption, the data collector 90 sends a packet using the assumed IP address of the egress interface with the TTL set to the previous intermediate system's numerical position in the path. By applying this test to the assumed egress interface's IP address, the data collector 90 can verify the validity of the assumption. If the results of the test destined for the egress interface IP address of the previous intermediate system are exactly the same as the results when testing to the previous intermediate system's ingress interface IP address, then the assumed egress interface IP address is valid for that previous intermediate system. The assumption is validated since the results of each test, executed with the same TTL parameters, return the same source IP address in the response packet sent by the intermediate system being tested even though the destination addresses being tested are different since the intermediate system should only ever respond with packets being sourced from the ingress interface.

If the assumption is not validated, the intermediate system is assumed to be a point-to-multipoint type circuit. The network mask is expanded by one bit and all possible addresses are tested within that logical network, except the ingress interface address, the network address, and the broadcast address, until a match is found. The process of expanding the mask and testing all available addresses is repeated until either a test match is found or a user defined mask limit is reached. If a match is found, then the egress interface is mapped onto the intermediate system node in the centralized server database 42. Once the path has been defined, metric tests are run on each intermediate system hop in the path to characterize the performance of the entire path. This performance is gauged on a weighted scale of the results of a series of tests, which may include response time, number of hops, available bandwidth, jitter, throughput, and reliability. New methods may be added in the future by simply defining the test method and adding the weight of the results to the scale. The metric test results for each intermediate system hop in the path are stored in centralized server database. This process is repeated over time for each network in the list on all data collectors 90 in the autonomous system 80. The final results for all networks tested by a single data collector are combined so that all duplicate instances of an intermediate system in the paths known by that data collector are collapsed into a single instance in a tree structure. The root of this tree data structure is the data collector node itself with each intermediate system being topographically represented by a single node in the tree. Metrics are represented in the database by a vector between nodes that is calculated based on a weighted scale of metric types. The length of the vector is determined by the results of the metric tests. The database may optionally store the unprocessed metric results for the intermediate system node as well.

2.2.2 Building a Tree of Internet Routing Policy

The results from all data collectors 90 are transferred to a central database server 40. The central server 40 interprets the results by finding nodes that represent the same intermediate system in the different trees. Intermediate systems nodes are determined to be duplicated across multiple tree data structures when an IP address for an intermediate system node in one collector's tree exactly matches an IP address for an intermediate system node in another data collector's tree. Nodes determined to be duplicated between trees are merged into a single node when the trees are merged into the final topology graph data structure.

2.2.3 Determining Desired Routing Policy for Points on the Internet

When routing control device 20 queries the central server 40, the central server 40 supplies the path metrics used by the routing control device 20 in the path selection process based on the routing control device's location in an autonomous system 80. If the central server 40 has not already mapped the location of the routing control device 20 in the a autonomous system 80, the routing control device 20 must determine its path into the autonomous system. To accomplish this, the routing control device 20 tests the path to each data collector 90 in the autonomous system 80 and supplies the results to the central server 40. The central server 40 analyzes these results to find an intersecting node in the path to the data collectors 90 and the autonomous system topology stored in the centralized database 42. Once the location of the routing control device 20 is known, the centralized server 40 may respond to path and metrics requests for destination networks made by the routing control device 20. Once supplied, the path and metrics information may be used as part of the route selection process by the routing control device 20. Once the routing control device 20 has selected the best path, a route is injected into the routing system 30 as specified in section 1.2.2.

What is claimed is:

1. A method facilitating the testing of paths to destination networks in relation to at least one metric, each destination network associated with at least one path, comprising
    segregating, using a routing control device, a plurality of destination networks into at least two groups;
    interleaving, based on the groups created in the segregating step, the injection and testing of paths associated with the plurality of destination networks into a set of routers associated with the routing control device; and
wherein the testing of paths comprises:
    as to each path, identifying a target intermediate system; and
    transmitting, as to each route, at least one hop-limited test packet, wherein the at least one hop-limited test packet is addressed to the destination network, but configured to expire at the target intermediate system in the route.

2. A method facilitating the testing of paths to destination networks in relation to at least one metric, each destination network associated with at least one path, comprising
    (a) segregating, using a routing control device, a plurality of destination networks into at least two groups;
    (b) injecting a set of routes associated with corresponding destination networks in a first group of the at least two groups into a routing domain that comprises one or more routers;
    (c) injecting a set of routes associated with corresponding destination networks in the next group of the at least two groups into the routing domain;
    (d) testing the set of previously injected routes associated with the preceding group in relation to at least one metric; and,
    (e) repeating the injecting and testing steps (c) and (d), cycling through the at least two groups, until all paths associated with the plurality of destination networks have been tested.

3. The method of claim 2 wherein the routes are host routes to the respective broadcast addresses associated with the destination networks.

4. The method of claim 2 wherein the number of groups is determined by dividing the number of desired destination networks by the number of available testing resources.

5. The method of claim 2 further comprising
    as to each path, identifying a target intermediate system; and
wherein the testing step comprises:
    transmitting, as to each route, at least one hop-limited test packet, wherein the at least one hop-limited test packet is addressed to the destination network, but configured to expire at the target intermediate system in the route.

* * * * *